(12) United States Patent
Joshi et al.

(10) Patent No.: US 7,647,763 B2
(45) Date of Patent: Jan. 19, 2010

(54) POLYOXYMETHYLENE AS STRUCTURAL SUPPORT MEMBER AND PROPELLANT

(75) Inventors: Prakash B. Joshi, Andover, MA (US); Bernard L. Upschulte, Nashua, NH (US); Alan H. Gelb, Boston, MA (US); B. David Green, Methuen, MA (US); Dean M. Lester, Brigham, UT (US); W. David Starrett, Roy, UT (US); Ingvar A. Wallace, Brigham City, UT (US)

(73) Assignees: Physical Sciences, Inc., Andover, MA (US); Alliant Techsystems Inc., Edina, MN (US)

( * ) Notice: Subject to any disclaimer, the term of this patent is extended or adjusted under 35 U.S.C. 154(b) by 464 days.

(21) Appl. No.: 11/086,789

(22) Filed: Mar. 22, 2005

(65) Prior Publication Data

US 2009/0313967 A1    Dec. 24, 2009

Related U.S. Application Data

(63) Continuation of application No. 10/884,795, filed on Jul. 1, 2004, now abandoned, which is a continuation of application No. 10/688,860, filed on Oct. 17, 2003, now Pat. No. 6,904,749.

(60) Provisional application No. 60/419,897, filed on Oct. 18, 2002, provisional application No. 60/419,898, filed on Oct. 18, 2002, provisional application No. 60/419,899, filed on Oct. 18, 2002.

(51) Int. Cl.
*F02K 9/00*    (2006.01)
(52) U.S. Cl. .................... 60/253; 60/219; 102/287
(58) Field of Classification Search ............. 60/219, 60/253, 255; 102/287, 291
See application file for complete search history.

(56) References Cited

U.S. PATENT DOCUMENTS

| | | | | |
|---|---|---|---|---|
| 2,987,881 A * | 6/1961 | Mullane | ............... | 60/254 |
| 3,017,746 A * | 1/1962 | Kiphart | ............... | 60/255 |
| 3,250,216 A * | 5/1966 | Typaldos | ............. | 102/381 |
| 3,776,137 A * | 12/1973 | Abbott | ............. | 102/431 |
| 3,848,532 A * | 11/1974 | Abbott | ............. | 102/517 |
| 4,004,523 A * | 1/1977 | Clifford et al. | ........ | 102/290 |
| 4,042,174 A * | 8/1977 | Vaughn | ............... | 239/743 |
| 4,170,875 A * | 10/1979 | Edwards | ............. | 60/253 |
| 4,176,655 A | 12/1979 | Levy | | |
| 4,619,722 A * | 10/1986 | Marion | ............... | 149/41 |
| 4,821,511 A * | 4/1989 | Felix et al. | ........... | 60/255 |
| 5,149,384 A * | 9/1992 | Marion | ............... | 149/19.1 |
| 5,305,601 A * | 4/1994 | Drain et al. | ........... | 60/255 |
| 5,561,261 A | 10/1996 | Lindstadt et al. | | |
| 5,671,599 A * | 9/1997 | Hocheri | ............. | 60/234 |
| 5,969,288 A * | 10/1999 | Baud | ............. | 102/466 |
| 6,079,202 A * | 6/2000 | Cesaroni et al. | ....... | 60/263 |
| 6,145,298 A * | 11/2000 | Burton, Jr. | ........... | 60/202 |
| 6,256,997 B1 * | 7/2001 | Longsworth | ......... | 62/6 |
| 6,332,318 B1 * | 12/2001 | Thorn | ............. | 60/512 |
| 6,386,841 B1 | 5/2002 | Probst | | |
| 6,691,621 B2 | 2/2004 | Pierrot et al. | | |

(Continued)

*Primary Examiner*—William H Rodríguez
(74) *Attorney, Agent, or Firm*—Hamilton, Brook, Smith & Reynolds, P.C.

(57) ABSTRACT

A vehicle includes at least one polyoxymethylene structural support member. The polyoxymethylene structural support member includes a polyoxymethylene component that is a propellant that provides thrust to the vehicle upon pyrolysis or combustion of the polyoxymethylene component of the product of pyrolysis of the polyoxymethylene component. The vehicle can be a satellite or other type of spacecraft.

5 Claims, 28 Drawing Sheets

U.S. PATENT DOCUMENTS

| | | |
|---|---|---|
| 6,904,749 B2 | 6/2005 | Joshi et al. |
| 6,966,184 B2 * | 11/2005 | Toyomura et al. .......... 60/641.8 |
| 2004/0154710 A1 | 8/2004 | Watabiki |
| 2004/0231770 A1 | 11/2004 | Bley et al. |
| 2008/0092768 A1 * | 4/2008 | Krstic ........................ 102/522 |

* cited by examiner

POLYOXYMETHYLENE AS STRUCTURAL SUPPORT MEMBER AND PROPELLANT

RELATED APPLICATIONS

This application is a continuation of U.S. application Ser. No. 10/884,795, filed Jul. 1, 2004 now abandoned, which is a continuation of U.S. application Ser. No. 10/688,860, filed Oct. 17, 2003 now U.S. Pat. No. 6,904,749 which claims the benefit of U.S. Provisional Applications Nos. 60/419,897, 60/419,898, and 60/419,899 which were each filed on Oct. 18, 2002. The entire teachings of all of those applications are incorporated herein by reference.

GOVERNMENT SUPPORT

Portions of this invention's development were supported under two government contracts: 1) U.S. Air Force Research Laboratory, Kirtland AFB, Contract No. F29601-99-C-0095; and 2) Defense Advanced Research Project Agency, through Office of Naval Research Contract No. N00014-00-C-0437. The Government has certain rights in the invention.

BACKGROUND OF THE INVENTION

Structural components in aerospace and underwater vehicle systems contain fluids or bear mechanical loads. They add mass to the vehicle, which reduces the amount of onboard propellant the vehicle is able to carry. This in turn limits the payload weight that the vehicle is able to carry as well as its endurance, range, and/or velocity.

In current aerospace and underwater vehicle systems, structural components are often sized to withstand the acceleration and vibration loads encountered during launch. After launch, the vehicle experiences relatively insignificant loads and much of the mass of the structural components is unnecessary, particularly for those vehicles which are expendable, non-serviceable, or non-reusable. In those cases, the momentum associated with the structural mass constrains maneuverability and can limit mission performance.

Past attempts at utilizing structural mass after launch include the use of thermoplastics (e.g., fluoropolymers such as polytetrafluoroethylene, which is currently used in pulsed plasma thrusters). One limitation of these past approaches is that these thermoplastic thrusters are designed for high impulse (e.g., thousands of seconds), but extremely low thrust, propulsion. Generally, such thrusters are not suited for high thrust aerospace and underwater propulsion, which require large flows of fuel to produce the thrust. Furthermore, combustion of fluoropolymers typically requires high pyrolysis temperatures (~500° C.), and results in production of soot that is unacceptable on many missions, particularly space missions involving sensitive equipment. Combustion of polytetrafluoroethylene also tends to produce high molecular weight products that can limit propulsion performance (i.e., specific impulse).

Therefore, a need exists for a composition that overcomes or minimizes the above-referenced problems.

SUMMARY OF THE INVENTION

The invention generally is directed to a vehicle, a method of propelling a vehicle, and a material, all of which employ polyoxymethylene.

The vehicle includes at least one polyoxymethylene structural support member, wherein the polyoxymethylene structural support member includes a polyoxymethylene component that is a propellant. The propellant provides thrust to the vehicle upon pyrolysis or combustion of the polyoxymethylene component or of a product of pyrolysis of the polyoxymethylene component. The polyoxymethylene component includes a solid oxidant or an energetic additive component.

The method of propelling a vehicle includes the steps of employing at least a portion of a solid material, wherein the solid material is a structural member and includes polyoxymethylene and a solid oxidant or an energetic additive, to produce a propulsive gas. At least a portion of the propulsive gas is directed away from the vehicle to provide thrust, thereby propelling the vehicle. For example, directing the propulsive gas from the vehicle in an asymmetric manner can provide thrust.

The process for fabricating structural composites includes placing a mold material between plates of a mold. The mold material includes polyoxymethylene and at least one material selected from the group consisting of an oxidant, a structural reinforcement and an energetic additive. Pressure is applied to at least partially cure the mold material and thereby form a polyoxymethylene rod. In one embodiment, the polyoxymethylene rod is machined to produced radial slots. Additional structural reinforcement is inserted into the radial slots. The polyoxymethylene rod is then inserted into a metallic cylinder and polyoxymethylene is further cured.

This invention provides a material that has utility during both launch and post-launch portions of a vehicle's mission. During launch, the material can provide structural support to at least a portion of the vehicle. In the vehicle's post-launch phase, the material can provide propulsive force.

The present invention has many advantages. For example, polyoxymethylene (POM) possesses many favorable mechanical characteristics. POM has a tensile strength that is about two-thirds that of elemental aluminum, yet POM only has about half the density (POM's density is about 1.4 g/cm$^3$). Also, POM is stable in low pressure environments. This allows the fuel to withstand large changes in pressure without significant degradation. POM also has a low coefficient of thermal conductivity, which ensures that as parts of the vehicle are converted into fuels, the remaining structure does not heat excessively.

The polyoxymethylene material of the invention pyrolyzes at relatively low temperatures (beginning at about 120 C), leaving little residue and creating little or no soot. The material can be employed to produce clean gaseous fuels, which can be used to produce thrust or energy, or it can be combusted with a separate liquid, solid or gaseous oxidizer to produce thrust or energy. This makes it particularly advantageous for vehicles having contaminant-sensitive systems, such as spacecraft possessing sensitive optical devices. The decomposition products tend to be relatively low molecular weight materials, which means that the fuel provides a relatively large amount of thrust and specific impulse compared to conventional materials.

Some additional advantages of this invention include the capacity to provide, for example, light-weight, multi-functional materials; decreased vehicle mass and launch weights; increased payload capacity; enhanced vehicle maneuverability; increased vehicular life spans; and the ability to provide end-of-lifetime orbit-raising (or deorbiting) capacity.

DETAILED DESCRIPTION OF THE INVENTION

Figure 1:
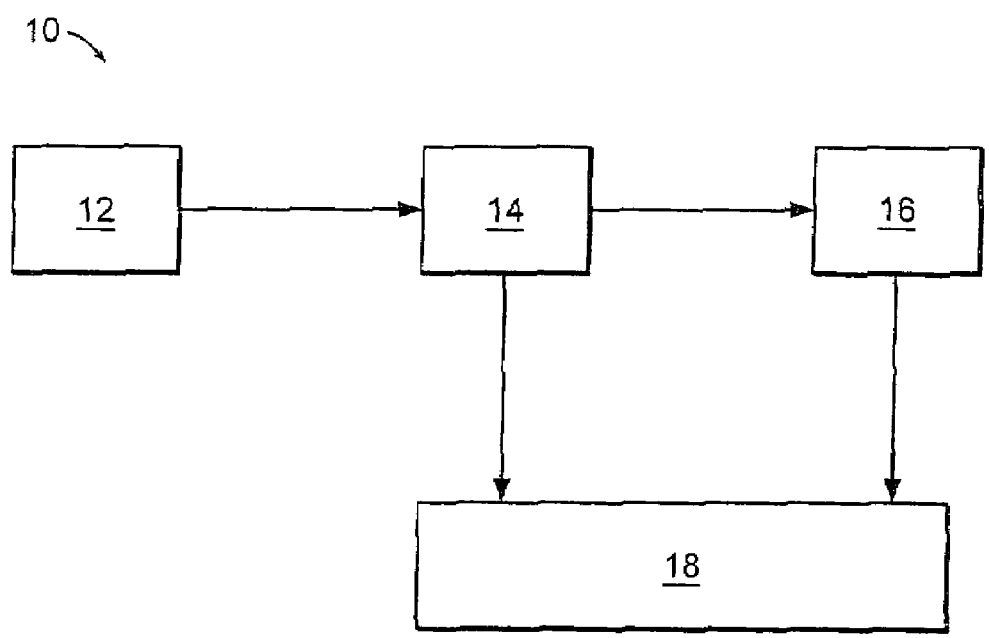
FIG. 1 schematically illustrates the concept of pyrolyzing polyoxymethylene by the method of the invention and then combusting the resulting products with an oxidizer to produce gases for propulsion.

The foregoing and other objects, features, and advantages of the invention will be apparent from the following, more particular, description of preferred embodiments of the invention, as illustrated in the accompanying drawings in which like reference characters refer to the same parts throughout the different views. The drawings are not necessarily to scale, emphasis instead being placed upon illustrating the principles of the invention.

This invention provides for a vehicle comprising at least one polyoxymethylene structural support member that provides thrust to the vehicle upon pyrolysis or combustion of the polyoxymethylene or of a product of pyrolysis of the polyoxymethylene. In some embodiments, the polyoxymethylene structural support member has a dual-use in that it provides support to some portion of the vehicle and also can be used as a fuel.

In some embodiments, the present invention generally relates to a fuel comprising polyoxymethylene ("POM") that is employed to produce a propulsive gas. As used herein, a "fuel" is a material that is able to be employed as a propellant to produce a gas which is used to create energy or to produce thrust or propulsive force. The propulsive force can be produced directly by release of gases caused by pyrolysis or combustion of the fuel, or indirectly by accumulation and delayed release or combustion of products of pyrolysis or products of products of combustion of the fuel.

In some embodiments, the fuel of this invention includes at least one additional material such as, for example, a combustible material (e.g., an oxidant or an energetic additive) and/or a structural support material. The fuel is then referred to as a "composite material."

The fuel is a solid that includes POM, which is a family of acetal polymers with the general formula $(CH_2O)_n$. Compositions of POM are available commercially, often including various additives and thermal stabilizers. One composition, DELRIN® ("POM-A"), is available from E.I. du Pont de Nemours & Co. (Wilmington, Del.) and includes at least one proprietary additive and/or thermal stabilizer. In another embodiment, the fuel includes one or more stabilizing materials. In still another embodiment, the stabilizing materials are chemically bound to the POM in the fuel (e.g., copolymers and/or substituents of the POM polymer).

As used herein, "POM" refers to any of the polyoxymethylene family of polymers that may or may not include chain stabilizers and/or terminating additives. "POM-A" refers to DELRIN®. "POM-B" refers to POM with acetate end caps and no additives or thermal stabilizers. "POM" can be combusted with, for example, hydrogen peroxide or hot gaseous oxygen. POM-B can be combusted with, for example, nitrogen tetroxide.

In one embodiment, the fuel includes one or more oxidants and/or one or more energetic additives. In another embodiment, the oxidant is in a liquid form and is in contact with the fuel. In a further embodiment, the oxidant is a solid that is incorporated directly into the fuel.

Suitable oxidants can include hydrogen peroxide, nitrogen tetroxide, oxygen, nitrous oxide, nitrates (e.g., potassium nitrate, barium nitrate, sodium nitrate, hydroxylammonium nitrate, and strontium nitrate), chlorates (e.g., potassium chlorate, magnesium chlorate, and sodium chlorate), and perchlorates (e.g., ammonium perchlorate and potassium perchlorate).

"Energetic additives" are materials that enhance the pyrolysis or combustion of the fuel by, for example, increasing the fuel value of the fuel, the pyrolysis or combustion rate, increasing the amount of energy released during pyrolysis or combustion, and/or decreasing the amount of external energy needed to initiate pyrolysis or combustion. In one embodiment, the energetic additives are chemically compatible with the other materials of the fuel so that they may be incorporated directly into the fuel and will not react with the other materials at sub-pyrolytic or sub-combustion temperatures (e.g., the temperatures experienced during the fabrication of the fuel).

Examples of energetic additives include TNT (2,4,6-trinitrotoluene), RDX (cyclotrimethylenetrinitramine), TAX (1-acetyl-3,5-dinitrocyclotrimethylenetriamine), HMX, SEX (1-acetyl-3,5,7-trinitrocyclotetramethylenetetramine), nitroglycerin, nitroguanidine, nitrocellulose, and Composition B (a castable explosive, usually made with RDX and/or TNT as the main ingredient).

In one embodiment, the fuel includes at least one additional structural support material. The additional structural support material can increase the structural strength of the fuel. For example, the tensile strength of the fuel can be increased by inclusion of at least one structural support material embedded in the POM of the fuel. In a further embodiment, at least one additional structural support material is included to increase the fuel's in-plane or axial stiffness. In another embodiment, the structural support material encases the POM to contain products of pyrolysis and combustion and to shield it from degrading environmental effects such as solar UV radiation, ionizing radiation, or atomic oxygen erosion. In a further embodiment, the structural support material forms a conduit through which the products of pyrolysis are directed. Examples of suitable structural support materials include metallic facesheets (e.g., titanium facesheets), metallic meshes, metallic tubes, metallic cloth, carbon or boron fibers, carbon cloth, carbon nanotubes, and ceramic materials. The term "non-combustible reinforced material" can include, for example, an external shell through which an oxidizing material, or oxidizer, may flow.

In a preferred embodiment, the additional structural support material is made of a material that will be consumed along with the POM during pyrolysis. Examples of suitable materials for such an embodiment include those made from carbon, such as carbon fibers (in a chopped or continuous form or woven into cloth), carbon nanotubes and boron. In an especially preferred embodiment, the additional structural support materials are chemically stable with (i.e., the support materials will not react with) the other materials in the fuel at sub-pyrolytic and/or sub-combustion temperatures so as to permit an all-solid state material that includes POM, the additional structural support material, and at least one solid oxidant and/or energetic additive.

The fuel is employed to produce a propulsive gas. For example, the fuel can be heated, pyrolyzed, combusted, and/or reacted to produce the propulsive gas.

In one embodiment, the fuel is heated to pyrolyze the POM and produce a propulsive gas. FIG. 1 schematically illustrates process 10, which is an examples of a general reaction scheme for pyrolyzing fuel 12 to produce propulsive gas 18.

During pyrolysis, the POM component of fuel 12 dissociates into first pyrolysis product 14, a gas composed mostly of formaldehyde. As used herein, the term "first pyrolysis products" refers to the gas or gases produced by the pyrolysis of the solid fuel and the POM included in the solid fuel. The general reaction is:

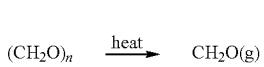

The conversion is accomplished with small expenditures of energy, ~2 kJ per gram of POM included in fuel 12. Solid POM is able to withstand the typical operating temperatures of spacecraft systems (from about −40° C. to about 70° C.), however, it will pyrolytically decompose at temperatures above its melting point (~175° C.), starting around 250° C. and completing around 400° C.

In some embodiments, other gases, in addition to the first pyrolysis products, are formed during the pyrolysis of the fuel. For example, gasses other than formaldehyde can be formed from the decomposition products of side groups on the POM polymer, copolymers in the POM polymer, and/or any additional material included in or reacted with the fuel (e.g., oxidants, energetic additives, and/or additional structural support materials consumed during pyrolysis).

Optionally, at least a portion of first pyrolysis product 14 is further pyrolyzed into second pyrolysis product 16. As used herein, the term "second pyrolysis products" refers to the gas or gases formed by further pyrolyzing the first pyrolysis products. For example, the formaldehyde gas in first pyrolysis product 14 can be converted to carbon monoxide and hydrogen gas by heating in the presence of a catalyst (e.g., platinum and/or ruthenium) in the general reaction:

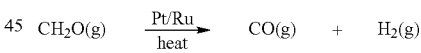

In this reaction, about 0.2 kJ of heat is needed per kilogram of formaldehyde. The composition of the second pyrolysis product will vary depending on reaction conditions, the composition of the first pyrolysis product, and whether the first pyrolysis products are reacted with any additional materials. Examples of component gases of the second pyrolysis product include hydrogen, water, carbon monoxide, carbon dioxide, nitrogen, nitrous oxide, nitrogen monoxide, and/or nitrogen dioxide.

In process 10, first and/or second pyrolysis product 14, 16 are released, or directed away, from a vehicle as propulsive gas 18. As used herein, the term "propulsive gas" refers to gases which produce a propulsive force or energy, and can include the first pyrolysis products, second pyrolysis products, their combustion products, and any other materials mixed and/or reacted with the first and second pyrolysis products.

In some embodiment, this invention provides a method of propelling a vehicle. In one example, the method includes the steps of employing at least a portion of a solid fuel to produce a propulsive gas, and directing at least a portion of the propulsive gas away from the vehicle to provide thrust, thereby propelling the vehicle. In further embodiments, the solid fuel is a structural member.

In some embodiments, the fuel is used as a monopropellant (i.e., no additional materials, such as an oxidant, need be reacted with the fuel or the pyrolysis products in order to provide thrust to a vehicle). In one monopropellant embodiment, the fuel is pyrolyzed and the resulting first pyrolysis product is directed through a nozzle as a propulsive gas to produce thrust, much like a conventional cold gas thruster on a spacecraft. Such an embodiment can be useful, for example, for those applications that require a low thrust and low specific impulse (~50 s) propulsive force, such as attitude control and station-keeping applications. In yet another embodiment, at least a portion of the first pyrolysis product is further pyrolyzed to produce a second pyrolysis product which is then directed through a nozzle as propulsive gas to produce thrust. This embodiment can be useful, for example, for those applications that require a moderate thrust and moderate specific impulse (~130 s) propulsive force, such as orbital maneuver applications.

In other embodiments, the fuel is employed as one component of a bi- or multi-propellant system (i.e., at least one additional material is reacted with the fuel or the pyrolysis products in order to provide thrust to a vehicle). In some bipropellant embodiments, a reactive chemical (e.g., an oxidant) is contacted with the fuel to initiate and/or sustain the combustion of the pyrolysis products.

In some embodiments, a fluid oxidant is contacted with the fuel and a combustion process results in the formation of a propulsive gas. For example, in one embodiment, a fluid oxidant (e.g., hydrogen peroxide, hydroxylammonium nitrate) is passed over a catalyst (such as silver or irridium), causing the oxidant to decompose. The products of the catalytic decomposition reaction and any uncatalyzed oxidant are combusted with the solid fuel material, creating combustion gases that include carbon dioxide and water. These combustion gases are directed away from the propellant system or vehicle to provide thrust.

In some embodiments, an ignition and/or heating means (e.g., a spark or a hot filament) is used to initiate the combustion process. In one embodiment, a heating or ignition source is exposed to the fuel while in the presence of a fluid oxidant, resulting in combustion that forms the propulsive gas. In other embodiments, the catalytic reaction heats the oxidant and reaction products to a sufficient temperature so that they combust with the fuel on contact (i.e., hypergolically) and ignition or heating means are not required and the combustion process continues until the fuel or oxidant supply is restricted or exhausted. In such a hypergolic embodiment, the flow of fluid oxidant can be controlled to increase or decrease the combustion rate, and in turn, control the amount of thrust or energy produced.

In some embodiments, the fluid oxidant and/or catalytic reaction products are directed to the site of combustion or pyrolysis through channels defined by the fuel. The fluid oxidant can be directed through the channels with the use of, for example, a pump or compressor. In another embodiment, a fluid oxidant is directed to a site of combustion that is remote from the site of pyrolysis to initiate and/or sustain the combustion of pyrolysis products. One example of this embodiment includes directing the pyrolysis products away from the fuel and into a separate combustion chamber where they contact and combust with a reactive chemical.

In some embodiments, the fuel includes a POM and a solid oxidant (e.g., potassium perchlorate). The fuel is combusted to form propulsive gases. These combustion gases are directed away from the propellant system or vehicle to provide thrust. In some embodiments, an ignition and/or heating means (e.g., a spark or a hot filament) is used to ignite or initiate the combustion process. Optionally, or in addition, a heated fluid oxidant is contacted with a fuel that includes a solid oxidant to initiate combustion.

In another embodiment, the fuel is pyrolyzed in the presence of at least one liquid or gaseous oxidant. At least a portion of the resulting first and/or second pyrolysis products contacts and combusts with the oxidant, and the heat released in the combustion reactions assists in further pyrolyzing the fuel and/or first pyrolysis products. The combustion products, along with any uncombusted pyrolysis products, are directed away from the vehicle as propulsive gas. In some embodiments, the oxidant is the rate-limiting reactant and combustion continues until the supply of oxidant is exhausted. These embodiments would be useful for those applications that require a high thrust and high specific impulse (e.g., greater than 250 seconds) propulsive force, such as applications involving orbital plane changes, orbit-raising, or deorbiting.

In some embodiments, the heat released during combustion is recycled as energy to drive pyrolysis. In those embodiments, the flow of the oxident is controlled in order to manipulate the rate of combustion and the amount of energy released. Manipulating the amount of energy released from combustion in turn increases or decreases the amount of energy available to drive pyrolysis of the fuel and/or the first pyrolysis product, thereby controlling the amount of propulsive gas and thrust produced.

In one embodiment, the nozzle is fabricated from a high-temperature material in order to withstand the combustion pressures and temperatures. Examples of high-temperature material include tungsten, graphite, rhenium coated graphite, or silica phenolic (such as DUREZ®, available from Occidental Chem. Corp., Dallas Tex.).

Figure 2:
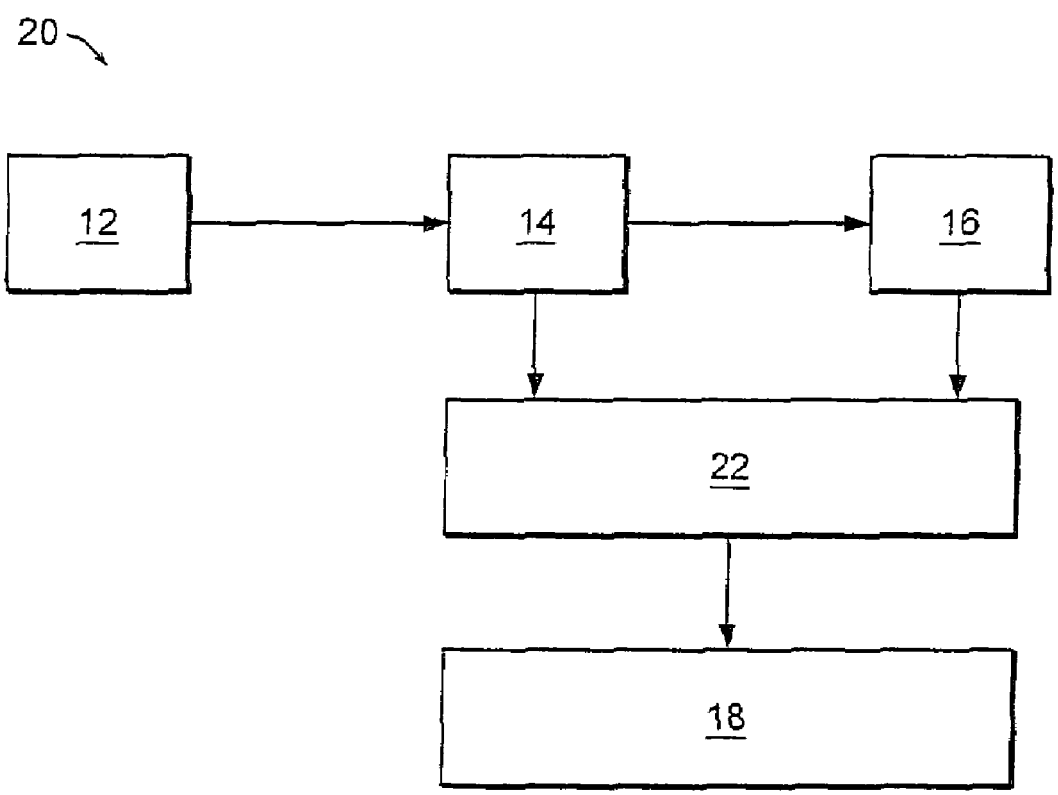
FIG. 2 schematically illustrates an example of a general reaction scheme for a bipropellant embodiment where the fuel of the invention is pyrolyzed to produce propulsion.

FIG. 2 schematically illustrates process 20, which is a general reaction scheme for a bipropellant embodiment where fuel 12 is pyrolyzed to produce propulsive gas 18. At least a portion of first and/or second pyrolysis product 14, 16 are combusted with oxidant 22, as described earlier.

The combustion products, along with any uncombusted first pyrolysis product 14, second pyrolysis product 16, and oxidant 22, are then released from the vehicle as propulsive gas 18. The combustion process is sufficiently exothermic to at least partially pyrolyze uncombusted fuel and first pyrolysis products. About 18 kJ of heat is released per gram of first and/or second pyrolysis products combusted, depending on the specific composition of the first and/or second pyrolysis products and whether any other reactants are used. In one embodiment, the heat released during the combustion is recycled as energy to drive the pyrolysis of the fuel and/or first pyrolysis products.

The exact composition of the propulsive gas depends, for example, on the original composition of materials utilized during the propulsive gas production process and the reaction conditions. Examples of individual gases comprising the propulsive gas include, but are not limited to, formaldehyde, hydrogen, carbon monoxide, water, carbon dioxide, nitrogen, nitrous oxide, nitrogen monoxide, and/or nitrogen dioxide.

In one embodiment, the pyrolysis and/or combustion of the fuel is initiated and/or sustained by a heat source. In another embodiment, further pyrolysis and/or combustion of the pyrolysis products is initiated and/or sustained by a heat source. Some examples of heat sources include a hot filament, a squib, or a bag igniter. In a preferred embodiment, the heat source is controlled in order to manipulate the amount of pyrolysis products formed, combustion products formed, and/or the amount of energy released during combustion, and in turn, control the amount of propulsive force produced. For example, modifying the amount of energy released from a heat source will decrease or increase the rate of pyrolysis and the amount of pyrolysis products formed, and consequently change the amount of propulsive gas released to generate propulsive force. If combustion of pyrolysis products is also involved, increasing or decreasing the amount pyrolysis products formed will impact the amount of material fed to the combustion process, and in turn, modify the amount of combustion products available for use as propulsive gas.

In another embodiment, the heat source also acts as an additional structural support material. For example, an additional structural support material in the form of a metallic mesh or wire included in the fuel could conduct electricity and act as a hot filament to initiate and/or sustain the pyrolysis reactions.

In one embodiment, the oxidant is a fluid. In yet another embodiment, the oxidant is a fluid stored in at least one storage tank positioned on or in the vehicle. In still another embodiment, the oxidant is withdrawn from the vehicle's operating environment. For example, a vehicle could draw atmospheric oxygen from its operating environment and react it with the fuel, the first pyrolysis product, and/or the second pyrolysis product. In a further embodiment, the fluid oxidant is directed to the site of pyrolysis and/or combustion. In yet another embodiment, the fluid oxidant is directed to the site of pyrolysis and/or combustion through at least one channel defined by the fuel.

In one embodiment, the vehicle is autophagous so that the propulsion continues as long as the oxidizer is contained within the vehicle or there is a sufficient supply of oxidant in the operating environment.

In another embodiment, the first pyrolysis product and/or the second pyrolysis product are stored in a container (e.g., a titanium storage tank) for use at a latter time. For example, the vapor pressure of formaldehyde is about 5 atm at 300 K and about 10 atm at 350 K, which allows it to be stored in a liquid-vapor equilibrium mixture at moderate pressures (e.g., about 300 to 500 psia) and temperatures (e.g., above about 60° C.). In one embodiment, a suitable titanium storage tank could be made with relatively thin walls, for example, walls about 10 mils or about 0.25 millimeters thick.

In some embodiments, the fuel is able to provide structural support to at least a portion of the vehicle for at least a portion of a mission, and this invention is suitable for any vehicle that would derive utility from such a material. Examples of portions of a vehicle suitable for this invention include structural members or composites which are needed for structural support during an early portion of a vehicle's mission, such as launching of a vehicle. Suitable structural members and composites include structural paneling, support beams and support rods.

In one embodiment, the vehicle is one that travels under water for at least a portion of its mission such as, for example, a torpedo or a rocket launched from a submerged platform. In another embodiment, the vehicle is one that travels through the atmosphere for at least a portion of its mission such as, for example, a rocket or a munition. In yet another embodiment, the vehicle is one that travels through outer space for at least a portion of its mission such as, for example, a satellite or a rocket.

In still more embodiments, this invention includes a vehicle. In one example, the vehicle comprising at least one polyoxymethylene structural support member that provides thrust to the vehicle upon pyrolysis or combustion of the polyoxymethylene or of a product of pyrolysis of the polyoxymethylene. In other embodiments, the vehicle is or includes a thruster. In further embodiments, the thruster includes a noncombustible shell and a fuel and/or a polyoxymethylene structural support member is contained within the noncombustible shell.

In yet other embodiments, this invention includes a vehicle propulsion system that provides propulsion to a vehicle. In one example, the vehicle propulsion system includes a fuel that includes polyoxymethylene and produces a propulsive gas when pyrolyzed, a noncombustible support material structurally supporting the fuel, and an exhaust channel through which the propulsive gas flows, wherein the exhaust channel is in fluid communication with the fuel.

FIGS. 3-10 illustrate representative embodiments of vehicles or portions of vehicles of the invention that utilize the fuel and are capable of operating in low pressure environments, such as outer space.

Figure 3:
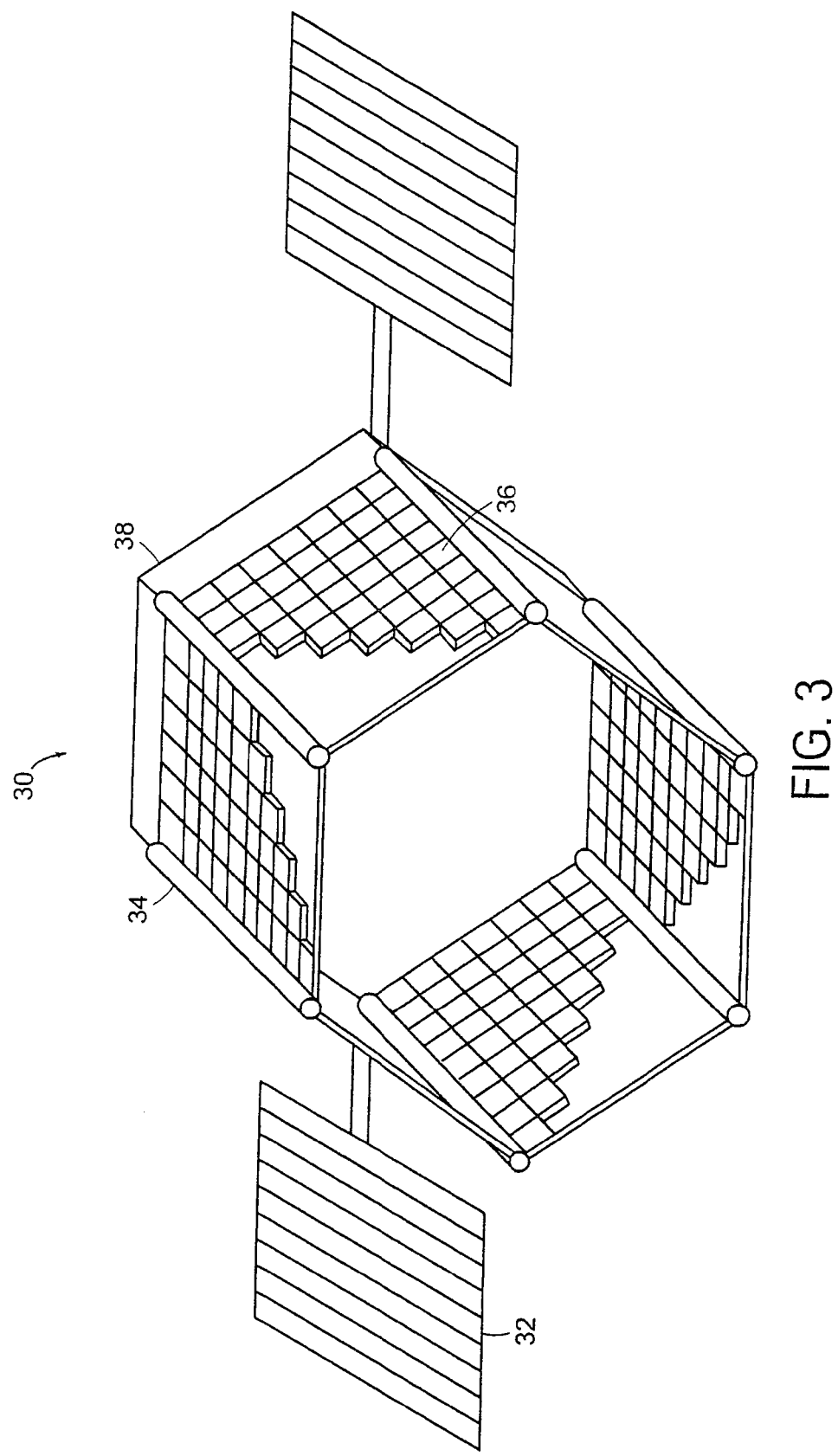
FIG. 3 illustrates one embodiment of a vehicle of the invention that utilizes a polyoxymethylene composition material as a structural material and as a propellant source.

FIG. 3 illustrates one possible embodiment of a vehicle of the invention that utilizes a fuel of the invention. Spacecraft 30 includes a vehicular propulsion system that produces thrust by directing a propulsive fluid (not shown) away from itself. Spacecraft 30 includes solar array 32, self-consuming stringer/thruster 34, self-consuming panel/thruster 36, and payload module 38. Self-consuming stringer/thruster 34 and panel/thruster 36 include the fuel of this invention. Inclusion of the fuel grants the self-consuming stringer/thrusters 34 and panel/thrusters 36 some form of additional structural support such as, for example, increased rigidity. When spacecraft 30 reaches a point in its mission where those fuel-bearing components have greater utility as a fuel source than as an additional structural support, self-consuming stringer/thrusters 34 and panel/thrusters 36 are employed to consume at least a portion of their fuel material via the processes and methods of this invention. The resulting gas or gases are directed away from spacecraft 30 as a propulsive gas, thereby producing a propulsive force.

Figure 4:
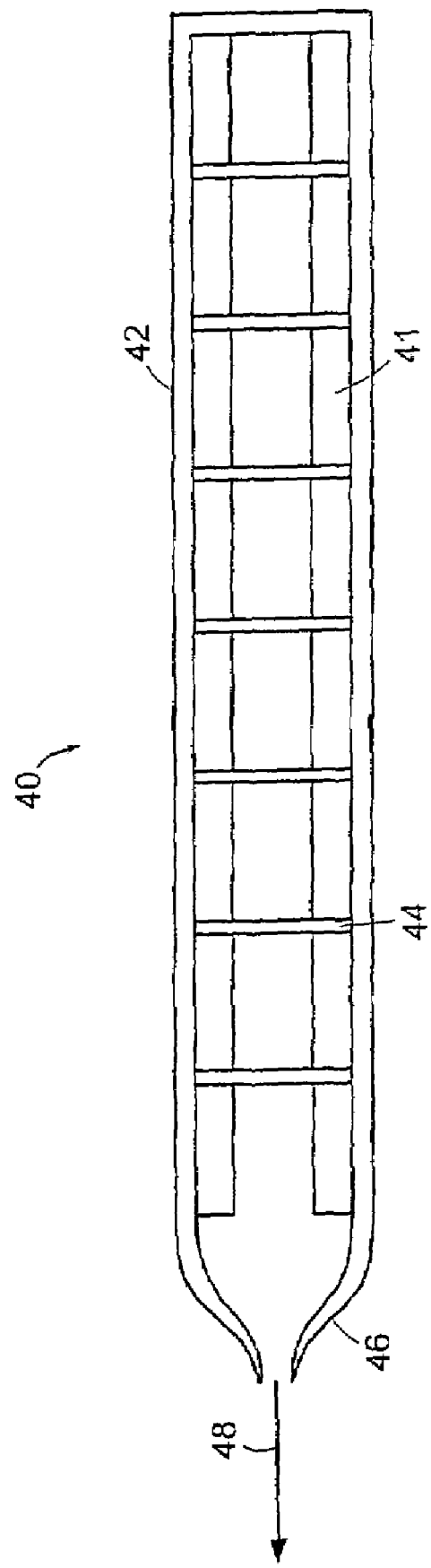
FIG. 4 illustrates a cross-sectional side view of one embodiment of a stringer/thruster of the invention, wherein the polyoxymethylene is segmented to provide restart capability.

FIG. 4 illustrates a cross-sectional side view of one embodiment of a stringer/thruster of the invention. Self-consuming stringer/thruster 40 includes shell 42, made of a noncombustible material capable of withstanding the temperatures and pressures produced during pyrolysis or combustion (e.g., titanium). Shell 42 protects fuel 41 within stringer/thruster 40. Dividers 44 span the inner width of shell 42, providing internal structural support to stringer/thruster 40 as well as segmenting fuel 41 into propellant cores. Fuel 41 is pyrolyzed via the processes and methods of this invention, and the resulting first pyrolysis product, second pyrolysis product, and/or their combustion products are directed away 48 from stringer/thruster 40 through nozzle 46, thereby producing thrust 49 in the opposite direction.

Figure 5:
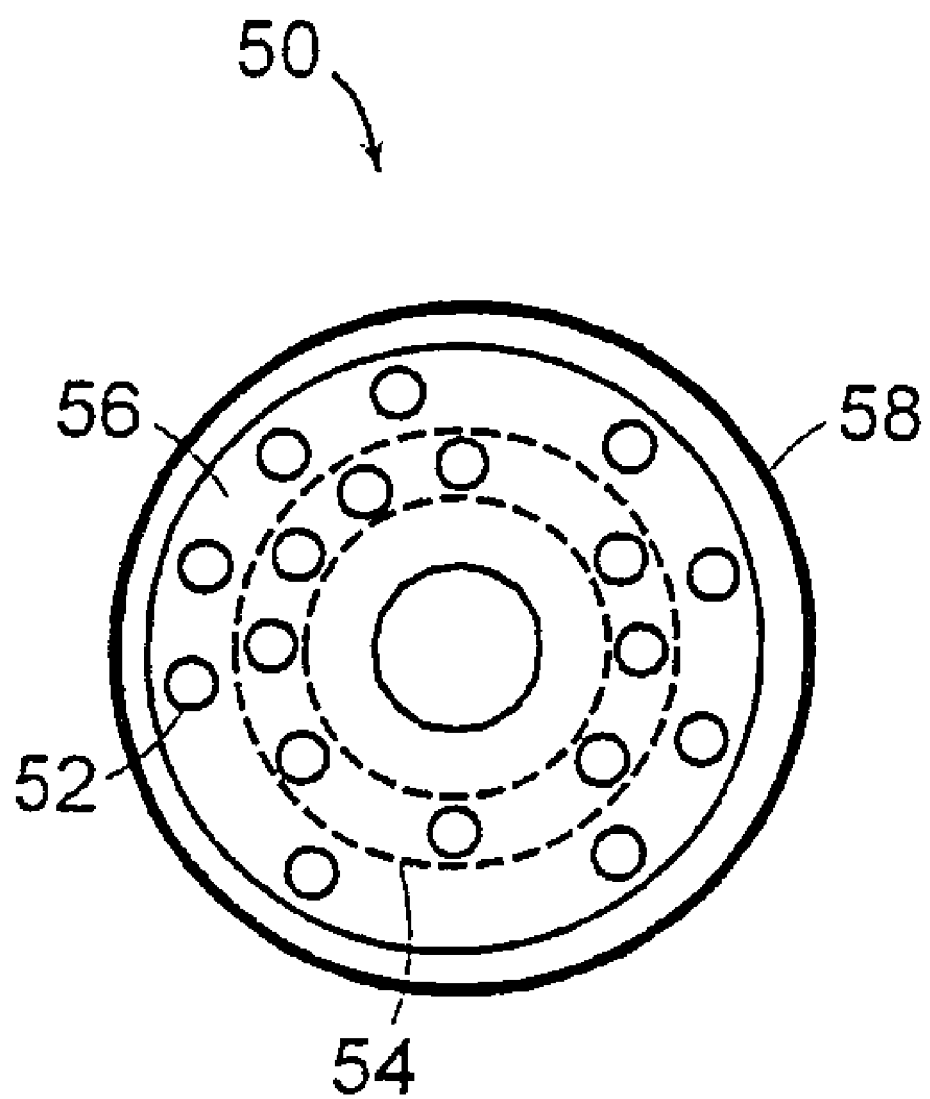
FIG. 5 depicts a cross-sectional radial view of another embodiment of a stringer/thruster of the invention, wherein a liquid and a gaseous oxidizer is introduced through multiple axial passages.

FIG. 5 depicts a cross-sectional radial view of another embodiment of a stringer/thruster of the invention. Self-consuming stringer/thruster 50 includes channels 52. Channels 52, which are defined by fuel 56, can carry at least one oxidant to the site of ignition and/or combustion. Shell 58 protects fuel 56. Fuel 56 includes additional structural support material, in the form of mesh 54. In one embodiment, the mesh is made from a material that functions as an electrical heater/igniter to initiate and/or sustain the thermal decomposition and combustion of the fuel, the first pyrolysis product, and/or the second pyrolysis product. Both the oxident and the pyrolysis product flow through channels 52, including the center channel.

Figure 6:
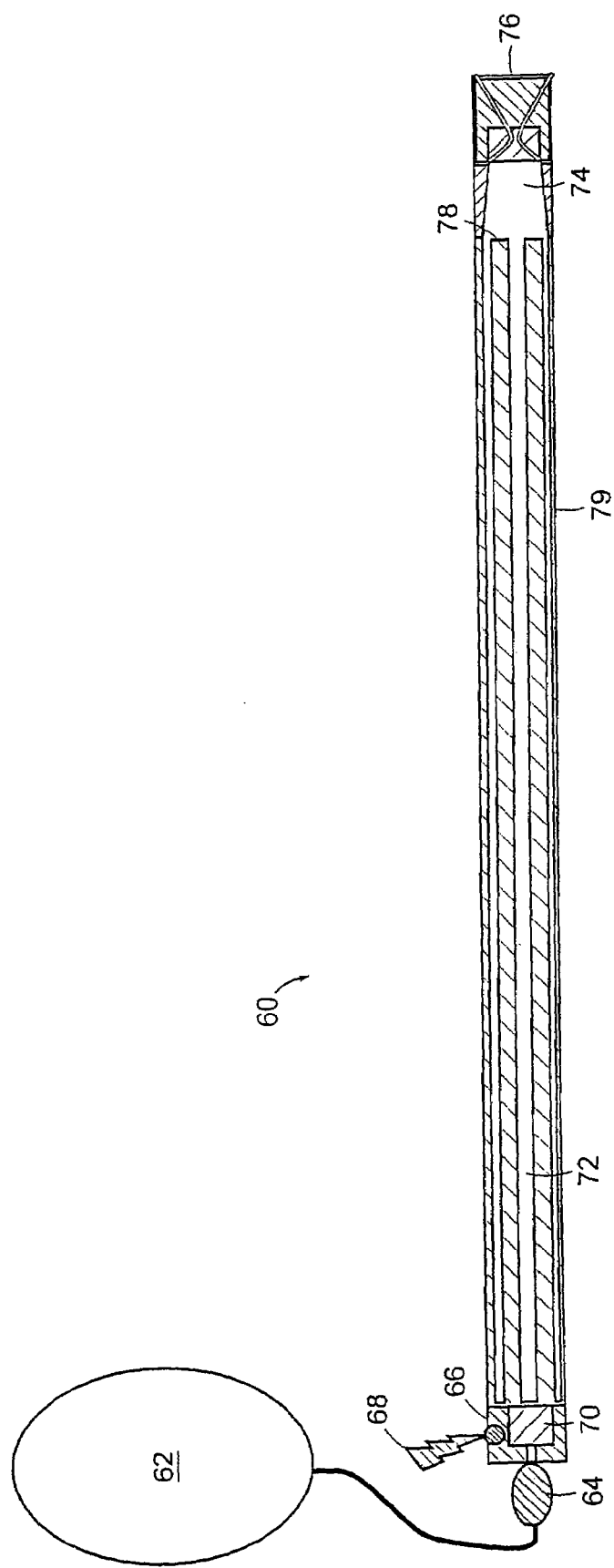
FIG. 6 shows a schematic representation of yet another embodiment of a stringer/thruster of the invention where a fluid oxidant is introduced through a single axial passage.

FIG. 6 shows a schematic representation of yet another embodiment of a stringer/thruster of the invention. Self-consuming stringer/thruster 60 utilizes a fluid oxidant. The fluid oxidant is stored in oxidant tank 62 and directed into self-consuming stringer/thruster 60 through flow control valve 64, which regulates the flow of oxidant into forward closure 66. In some embodiments, the forward closure is also used as an attachment point in order to secure the self-consuming stringer/thruster to a vehicle. Forward closure 66 includes heat source 68 and catalyst bed 70. Heat source 68 heats the oxidant as it enters forward closure 66. Catalyst bed 70 facilitates decomposition of the fluid oxidant 78, the first pyrolysis product, and/or second pyrolysis product. The oxidant flows through channel 72, contacting and reacting with fuel 78. The reaction products flow to combustion chamber 74 where they can react further. In some embodiments, the combustion chamber, as well as other portions of a self-consuming stringer/thruster, are lined with insulation in order to protect sensitive portions of the stringer/thruster or an attached vehicle from high combustion temperatures and/or pressures. The resulting gases are directed from stringer/thruster 60 through nozzle 76 as propulsive gas. Nozzle 76 is incorporated inside shell 79.

In one embodiment, if self-consuming stringer/thruster 60 depicted in FIG. 6 is sized to be about 44 inches long with an outer diameter of about 2 inches, the total mass of the thruster/stringer should be approximately 6 pounds, with a fuel mass of about 4 pounds. This would give a fuel mass fraction of about 0.67.

Figure 7:
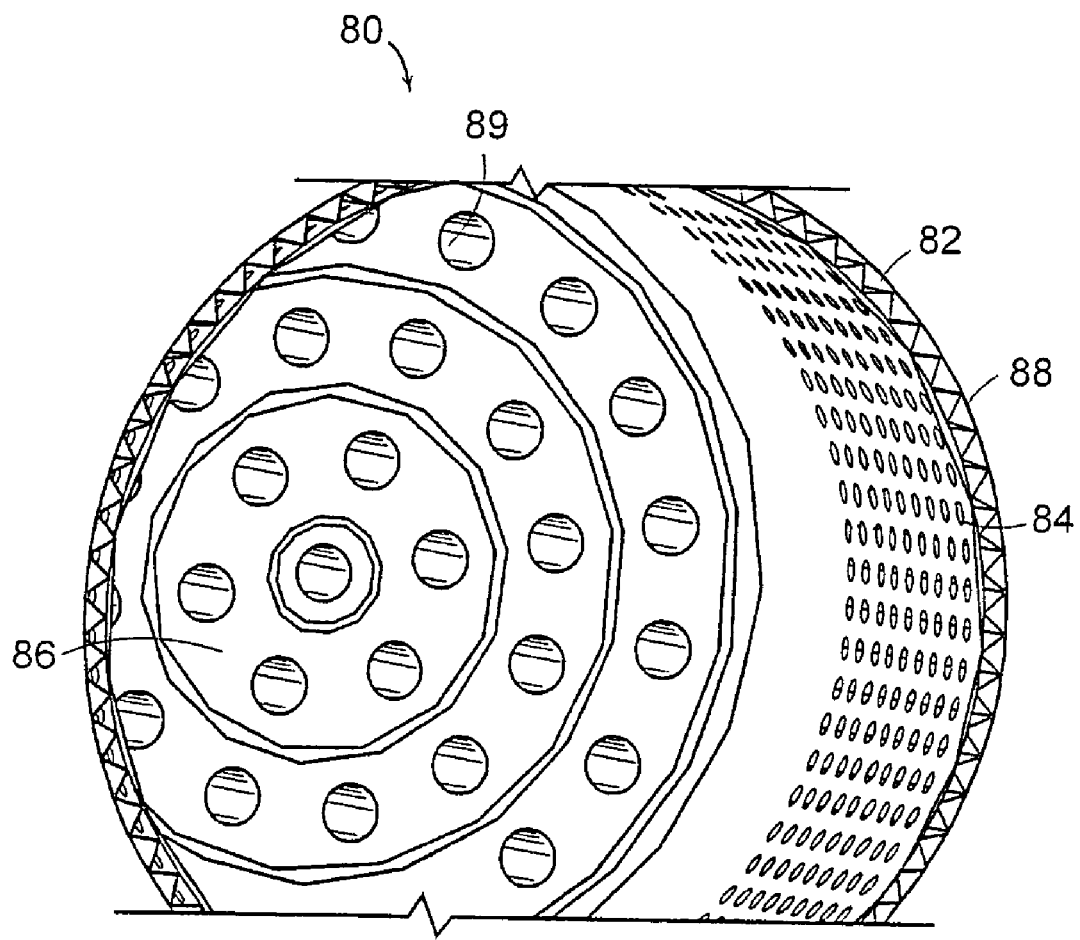
FIG. 7 depicts a cross-sectional radial view of the stringer/thruster of the invention shown in FIG. 5.

FIG. 7 depicts a cross-sectional radial view of self-consuming stringer/thruster 80. In addition to the oxidant that flows through channels 89, a secondary oxidant is introduced through secondary oxidant passages 82, which in this embodiment are shown as a series of grooves through which a second oxidant can flow. The second oxidant is injected towards the site of pyrolysis and/or combustion by secondary oxidant injectors 84, which perforate shell 88. The second oxidant assists in the pyrolysis and/or combustion of fuel 86, the first pyrolysis product, and/or the second pyrolysis product.

Figure 8:
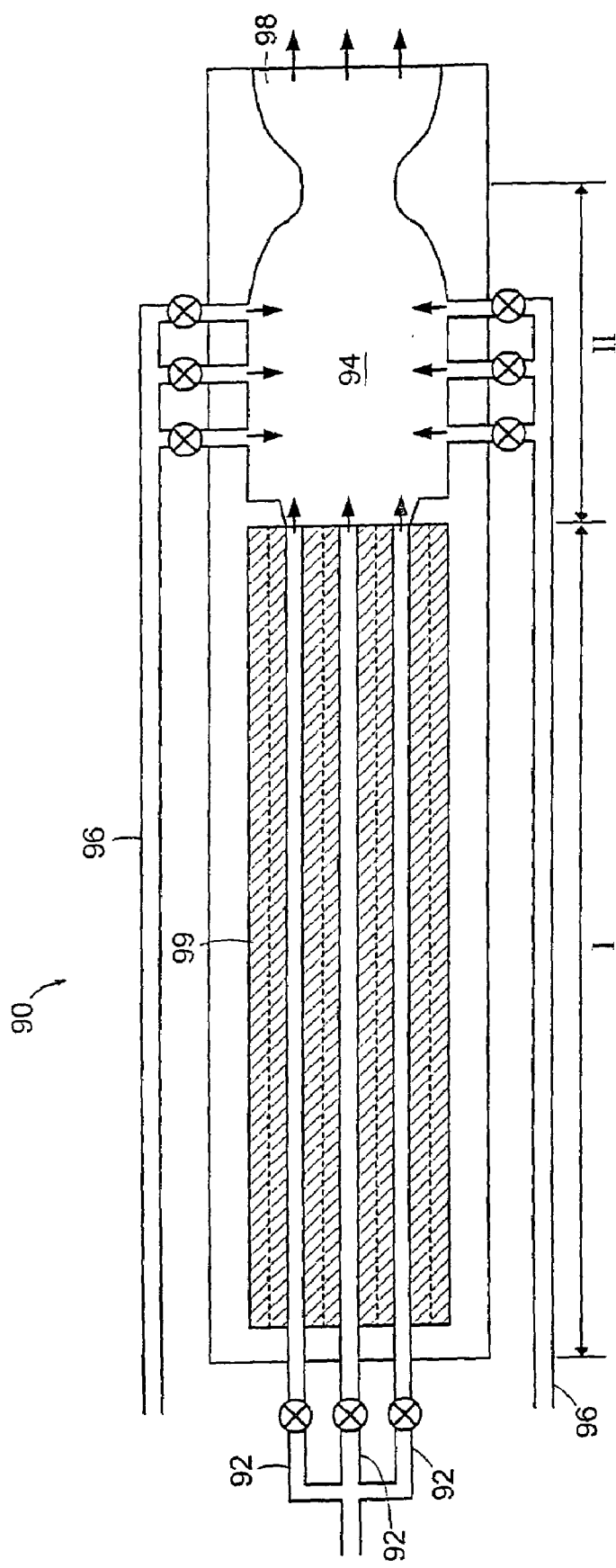
FIG. 8 illustrates a cross-sectional side view of yet another embodiment of a stringer/thruster of the invention, shown in FIG. 5.

FIG. 8 illustrates a cross-sectional side view of self-consuming stringer/thruster 90 in a configuration where the propulsive gas is combusted at a site downstream from where fuel 99 is initially pyrolyzed. Solid fuel 99 is contained in portion I of self-consuming stringer/thruster 90, where it is pyrolyzed to form the first pyrolysis product. In one embodiment, an oxidant is directed into portion I through channels 92 where it promotes the pyrolysis and/or combustion of fuel 99 and at least a portion of the resulting first and/or second pyrolysis product. The first and/or second pyrolysis product is directed to portion II of self-consuming stringer/thruster 90, where it undergoes further pyrolysis and/or combustion in combustion chamber 94. In one embodiment, an oxidant is directed into combustion chamber 94 through secondary oxidant passages 96, where it reacts with the first and/or the second pyrolysis product. The reaction products are directed away from stringer/thruster 90 through nozzle 98 as propulsive gas to provide thrust to stringer/thruster 90 and any attached vehicle.

Figure 9:
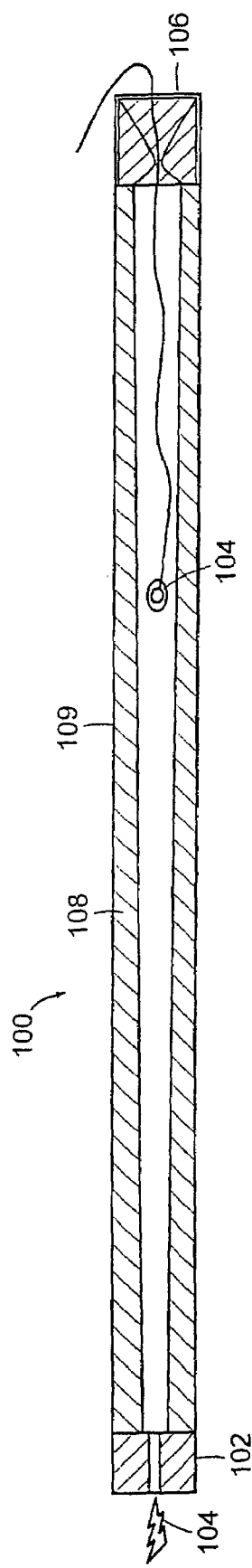
FIG. 9 illustrates a cross-sectional side view of still another embodiment of the stringer/thruster of the invention, wherein a solid oxidant is embedded within the polyoxymethylene.

FIG. 9 illustrates a schematic of all-solid state thruster 100. All-solid state thruster 100 includes fuel 108. Fuel 108 is formed in a predetermined shape in order to permit a desired thrust profile and flow efficiency. Fuel 108 incorporates an embedded solid oxidant. Examples of predetermined shapes include a tapered pattern or a star pattern. Fuel 108 is encased within shell 109, which is capable of withstanding combustion pressures and temperatures. In some embodiments, the pyrolysis and combustion reactions produce a low enough flame temperature that shell 109 is uninsulated, which reduces thruster mass.

Forward closure 102 is used for vehicle attachment and optionally includes ports for instrumentation and/or heat source 104. Thruster 100 can include one or more heat sources 104 which initiate or sustains the pyrolysis and/or combustion reactions. Examples of suitable heat sources include a hot filament, a squib, or a bag igniter.

The reaction products are directed away from all-solid state thruster 100 by passing them through a simple homogeneous nozzle 106 which is contained within the titanium sleeve of shell 109.

In one embodiment, all-solid state thruster/stringer with a similar configuration as thruster 100 depicted in FIG. 9 is sized to be about 40 inches long with an outer diameter of about 2 inches and a nozzle throat diameter of about 0.25 to 0.5. The total mass of the thruster/stringer is less than about 5 pounds, with a fuel mass of about 4 pounds. The fuel mass fraction is about 0.8 or greater. Actual thruster design dimensions and weights will vary depending on the application.

Figure 10:
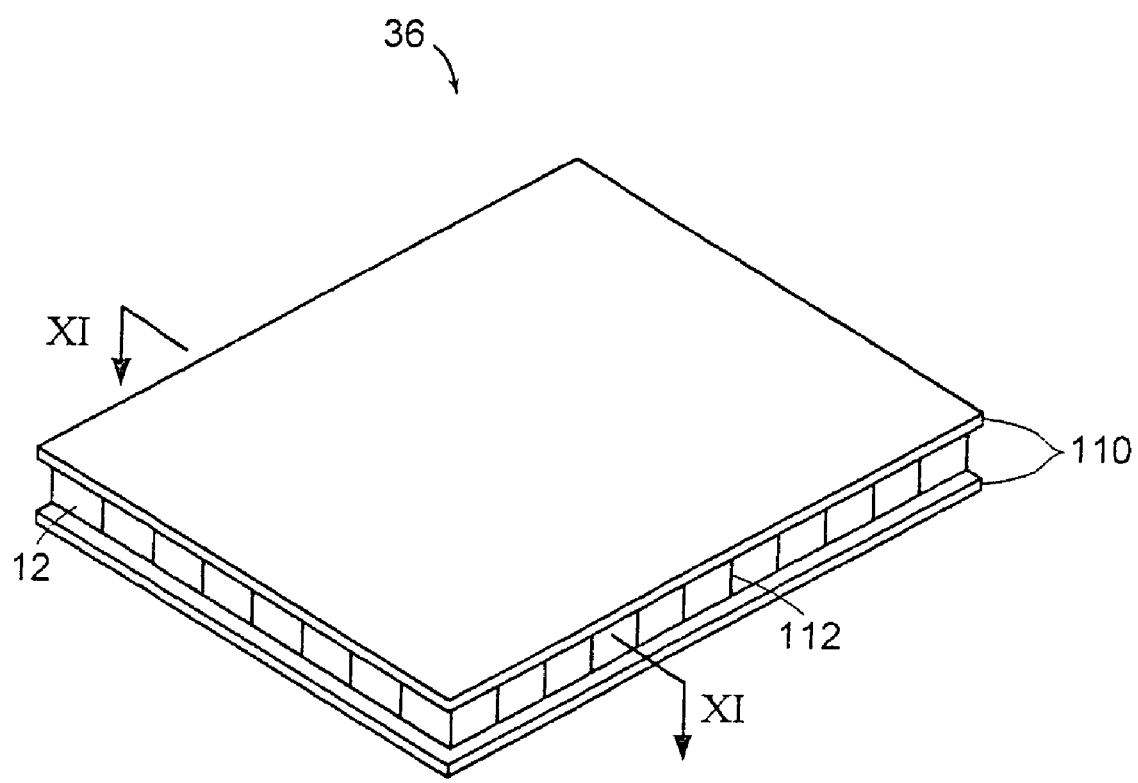
FIG. 10 depicts a portion of an embodiment of a panel/thruster of the invention.

Another embodiment of the invention is illustrated in FIG. 10 which depicts a more detailed view of a portion of panel/thruster 36. Shown in FIG. 3, panel/thruster 36 includes a layer of fuel 12 sandwiched by facesheets 110. In some embodiments, the facesheets are made from a material able to withstand the temperatures reached during pyrolysis and/or combustion, such as titanium. In other embodiments, the panel/thruster also incorporates other additional structural support material (e.g., a metallic or carbon mesh); oxidizing materials; channels for the flow of oxidant; heat sources; and/or insulating material. The layer of fuel 12 in panel/thruster 36 is partitioned into individual cells by dividers 112.

Figure 11:
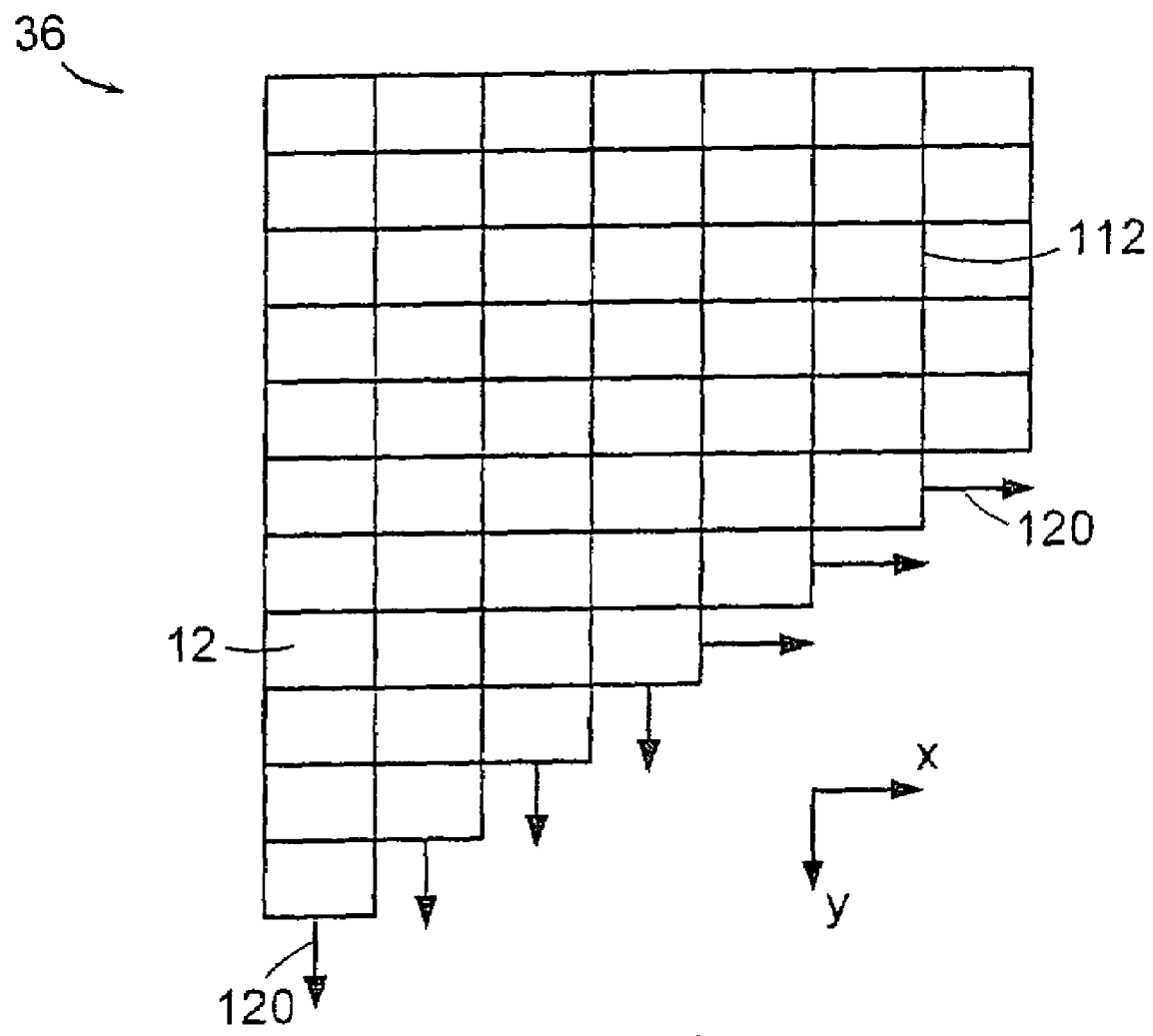
FIG. 11 depicts an overhead view of the panel/thruster of FIG. 10.

FIG. 11 depicts an overhead view of self-consuming panel/thruster 36 with facesheets 110 omitted in order to more clearly illustrated how fuel 12 is partitioned by dividers 112. Propulsive gases are formed by the previously mentioned methods and processes of this invention, and directed away from panel/thruster 36 through a suitable device, such as a nozzle (not shown), to produce thrust 120. In the embodiment illustrated in FIG. 11, the propulsive gas is directed in two directions at a right angle to one another so as to generate thrust along both the X and Y axes. In some embodiments, the panel/thruster is constructed so that the propulsive gas is capable of being directed by suitable means, such as a controllable and, optionally, multiported nozzle, at virtually any angle or combination of angles to provide thrust in a desired direction. For example, in one embodiment, the self-consuming panel/thruster is constructed to direct propulsive gas in the Z axis as well. In that way, the thrust is produced in any desired direction by, for example, controlling the amount of propulsive gas directed in either the X, Y, and/or Z axes.

Figure 12:
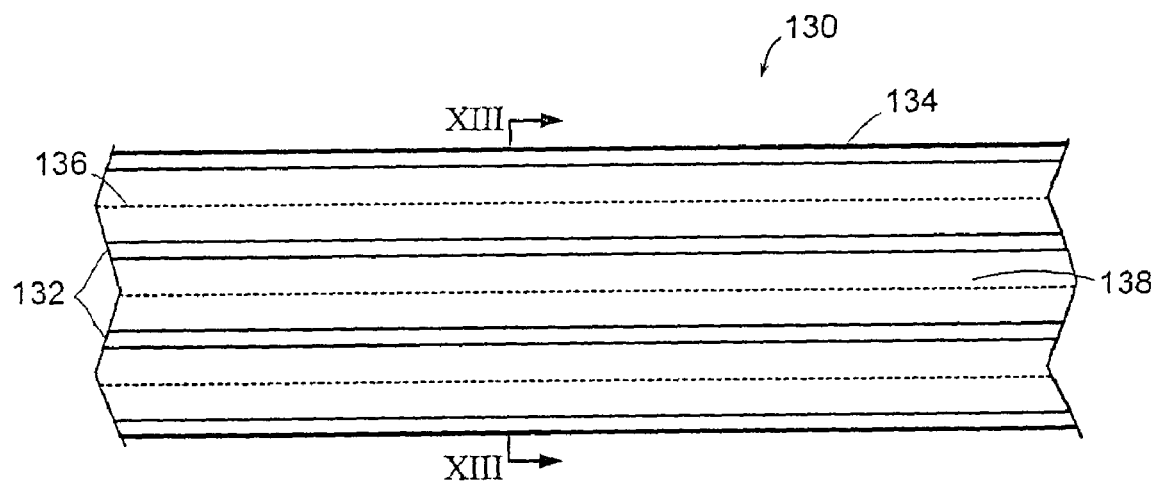
FIG. 12 depicts a cross-sectional side view of another embodiment of a panel/thruster of the invention.
Figure 13:
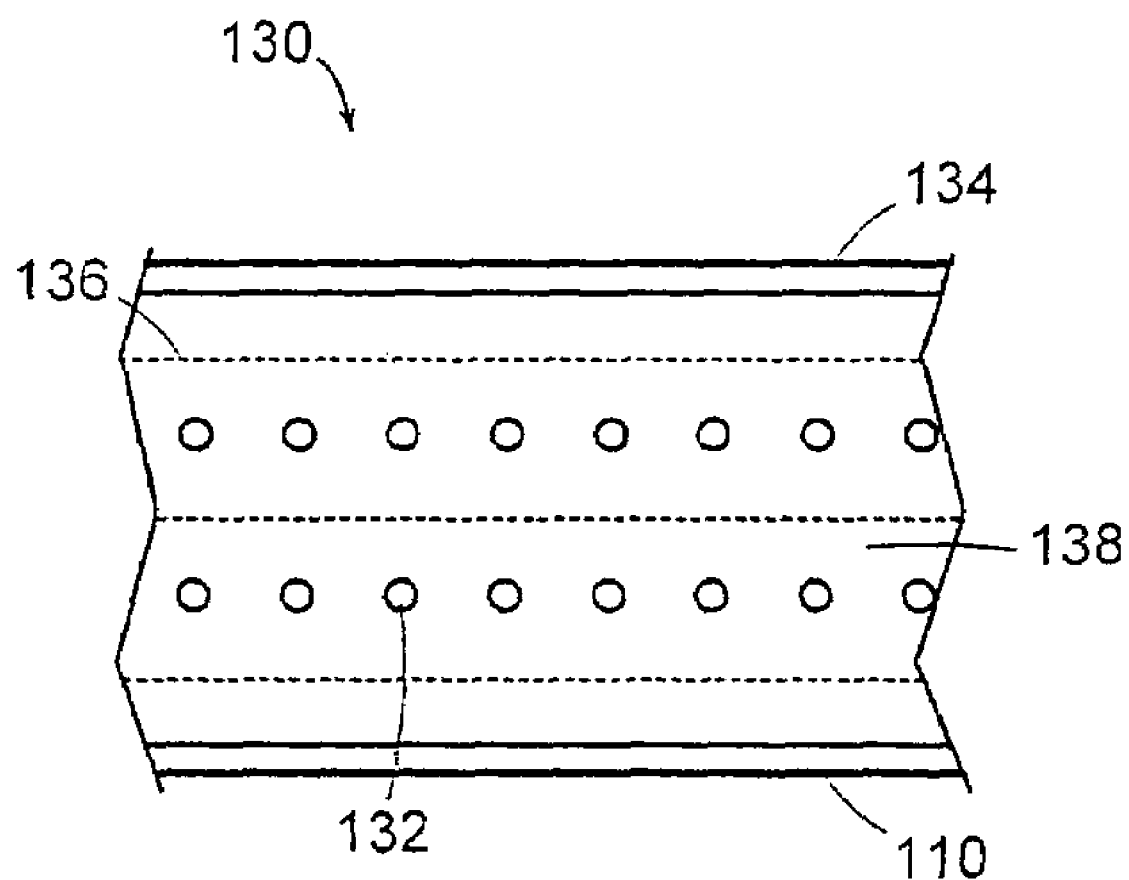
FIG. 13 depicts a cross-sectional view of the panel/thruster of FIG. 12.

FIGS. 12 and 13 depict a cross-sectional side view and a cross-sectional lateral view, respectively, of panel/thruster 130. Fuel 138 defines channels 132, which carry oxidizer to the site of pyrolysis and/or combustion. Panel/thruster 130 also includes facesheets 134, which sandwich fuel 138. Fuel 138 incorporates additional structural support materials, such as mesh 136, that also can operate as an ignition or heat source.

In some embodiments, this invention includes a method of producing work. For example, the method can comprise the steps of heating at least a portion of a material that includes polyoxymethylene to produce a gas and directing the gas to a means for producing work, thereby producing work.

An example of means for producing work is a turbine. A combustion and/or pyrolyzation reaction produces a gas from the fuels of this invention, and the gas is directed towards the turbine. The gas produces work, which the turbine uses to produce, for example, an electric current or other forms of energy.

This invention also includes a process for fabricating structural composites that include the fuel. In one embodiment, the processes includes the steps of placing a mold material that includes POM between plates of a mold, and applying pressure until the mold material has been cured. In another embodiment, the process includes heating the mold material until it has been cured at a temperature below the ignition temperature of the mold material. Preferably the temperature is between 160° C. to 185° C. Most preferably, the temperature is between 170° C. and 175° C. In yet another embodiment, a plurality of plates are used to produce more than one structural composite during a single curing process.

In one embodiment, additional materials are included in the mold material such as, for example, energetic additives, oxidants, and/or additional structural support materials. In another embodiment, the plates are lined with additional structural support material so that the finished structural composite is encased in the additional structural support material.

The pressure and/or heat of the mold is maintained until the mold material has been cured to the desired extent. Determining the extent to which the mold material should be cured and what combination or pressure and temperature to use can be accomplished through a variety of methods (e.g., visual inspection and testing of physical properties) and will depend on the physical properties required for a given application. For example, if tensile strength is a relatively important property of the finished structural composite, the cure time which gives the necessary strength can be found by testing structural composites cured for various periods of time and at various temperatures and pressures. In one embodiment, the cured structural composite is machined to the correct size and shape necessary for the application of interest.

In one embodiment, the process for fabricating structural composites include placing a mold material between plates of a mold, wherein the mold material includes polyoxymethylene and at least one material selected from the group consisting of an oxidant, a structural reinforcement, and an energetic additive, and applying pressure to the mold material to at least partially cure the mold material and thereby form a POM rod. In a further embodiment, the process includes machining the POM rod to produce radial slots, inserting additional structural reinforcement into the radial slots (e.g., carbon fiber structural reinforcement), and inserting the POM rod into a sleeve or cylinder. In some embodiments, the POM rod and cylinder can be heated to further cure the POM material. Suitable temperatures for further curing will vary with the demands of a given application. Examples of suitable temperature ranges for further curing include a range from about 160° C. to about 185° C., or a range from about 170° C. to about 175° C.

Figure 14:
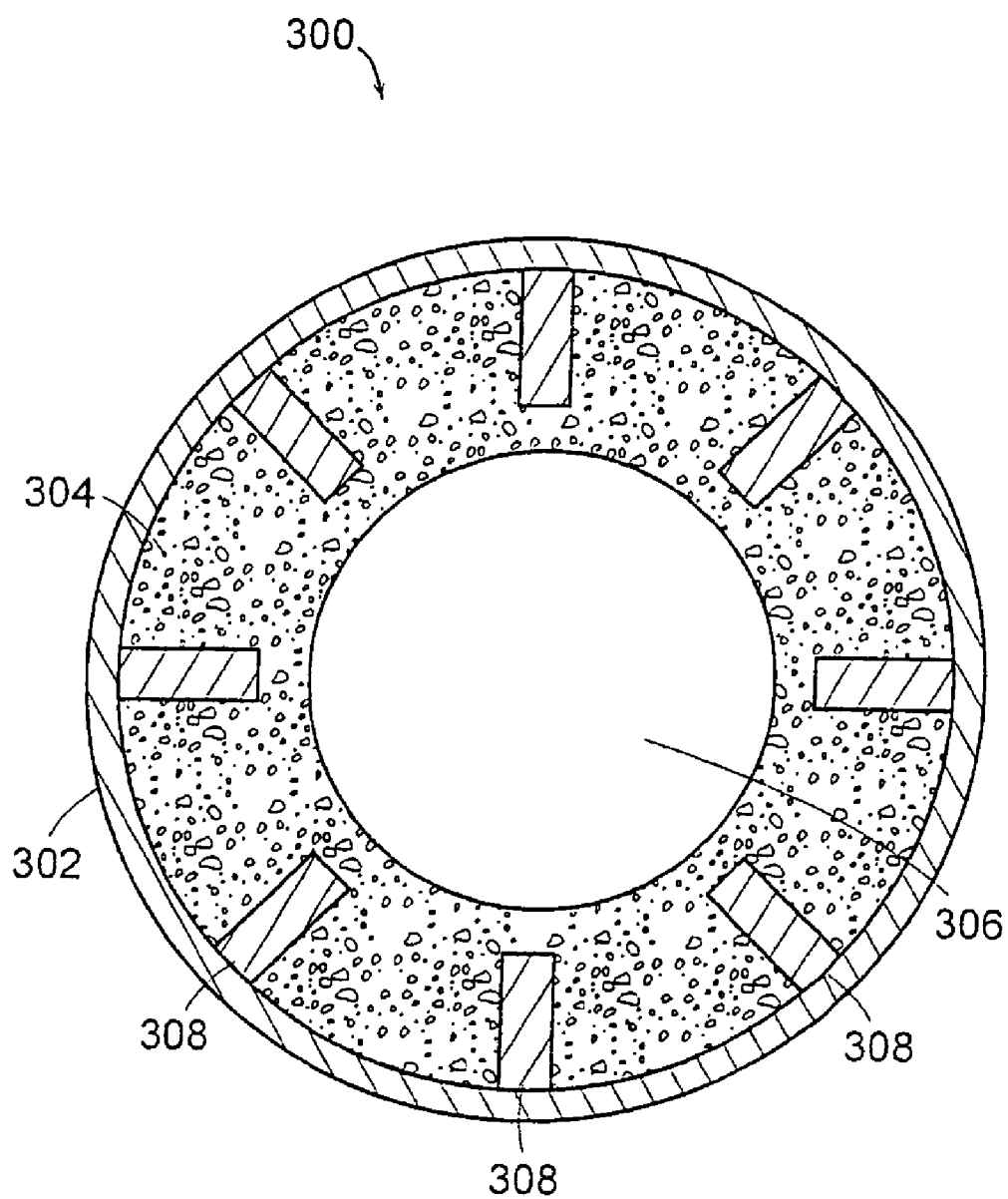
FIG. 14 depicts a cross-sectional view of an embodiment of a rod of the invention.

Example of cylindrical component 300, formed by the previously described methods, is shown in FIG. 14. Cylindrical component 300 includes POM material 304 encased by outer sleeve 302. In some embodiments, the outer sleeve is metallic or is a carbon tube made from carbon fibers and carbon cloth. Optionally, POM material 304 is reinforced with additional materials (e.g., carbon fibers, carbon cloth, boron fibers, boron cloth, metallic mesh, etc.). The particular method of fabrication will depend on the type of reinforcement material used and the type of outer sleeve material.

The following examples are not intended to limit the invention in any way.

Example 1

Fabrication of Cylindrical Component

A cylindrical component similar to that shown in FIG. 14 was formed by machining a commercially available rod of POM material 304 to produce center bore 306 and radial slots, into which longitudinal webs of reinforcement material 308 are inserted. Examples of suitable reinforcement material include carbon cloth or fiber within an epoxy or phenolic matrix.) The resulting reinforced POM rod was then cooled to a temperature of between about −10° C. to about 0° C. to induce shrinkage. Metallic sleeve 302 was heated above ~100° C. to induce radial thermal expansion. The POM rod was then inserted into the metallic sleeve and the assembly cured at temperatures in the range of about 100° C. to about 150° C. for over an hour to allow consolidation of reinforcement material 308 with the surrounding POM matrix. A tight mechanical force fit of the POM rod within the metallic sleeve was thus accomplished. Optionally, the bond between the POM rod and the metallic sleeve can be improved by application of commercially available bonding agents such as, for example, the rubber-based CHEMLOCK thermosetting adhesive and NARMCO thermosetting adhesive, epoxy-based RESINWELD thermosetting adhesive, and phenolic-based Phenoweld® thermosetting adhesive.

Example 2

Summary of Open Burning Results

An amount of POM-A and POM-B was warmed in the presence of various oxidants to measure melting, pyrolysis, and self-ignition points.

POM-A, combined with either $N_2O_4$, $NO_2$, or air, melted at about 175° C. Pyrolysis began at about 235° C. POM-A, combined with either $N_2O_4$ or $NO_2$, self-ignited at around 235-275° C., and at around 350-400° C. when mixed with air. These values are in line with known values, which cite a melting point of about 175° C., a pyrolysis point of between about 200° C. and about 400° C., and a self-ignition point with air in the range of about 323-375° C.

POM-B, combined with either $N_2O_4$, $NO_2$, or air, melted at about 165° C. Pyrolysis began at about 215° C. POM-B, combined with either $N_2O_4$ or $NO_2$, self-ignited at around 250-275° C. POM-B, combined with air, self-ignited at a temperature greater than about 350° C.

Example 3

Mass Spectrometry Data of Thermal Decomposition Products

Figure 15:
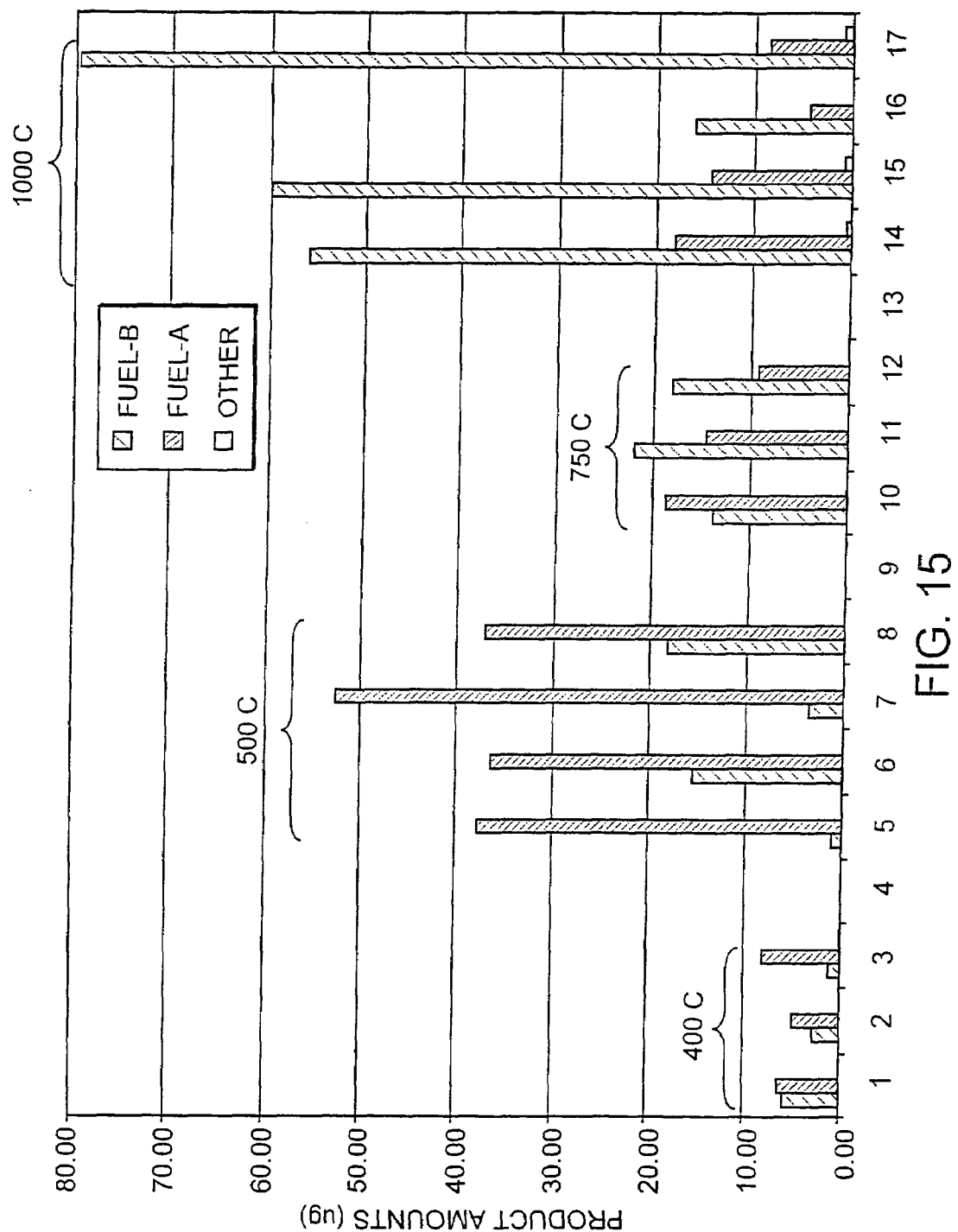
FIG. 15 is a representation of the amounts of formaldehyde and carbon monoxide products of thermal decomposition of POM at various temperatures. The molar concentration of hydrogen, also a pyrolysis product, is equal to the molar concentration of carbon monoxide.

FIG. 15 shows mass spectrometry data for products (measured in μg) produced during the thermal decomposition of POM at various temperatures. The products include carbon monoxide, formaldehyde, and other compounds (such as water or carbon dioxide) that were formed in side reactions or were initially present as impurities in the reaction materials. The presence of hydrogen was inferred from the presence of carbon monoxide. The trial runs listed as 1-3 were conducted at a temperature of ~400 C, those listed as 5-8 were conducted at ~500 C, those listed as 10-12 were conducted at ~750 C, and those listed as 14-17 were conducted at ~1000 C. The data clearly demonstrates that at temperatures of ~500° C. or less, the primary fuel product is formaldehyde. For decompositions at temperatures above ~750° C. the primary fuel products are carbon monoxide and hydrogen.

Example 4

Measurements of Pressure and Temperature in Formaldehyde Storage Chamber

Figure 16:
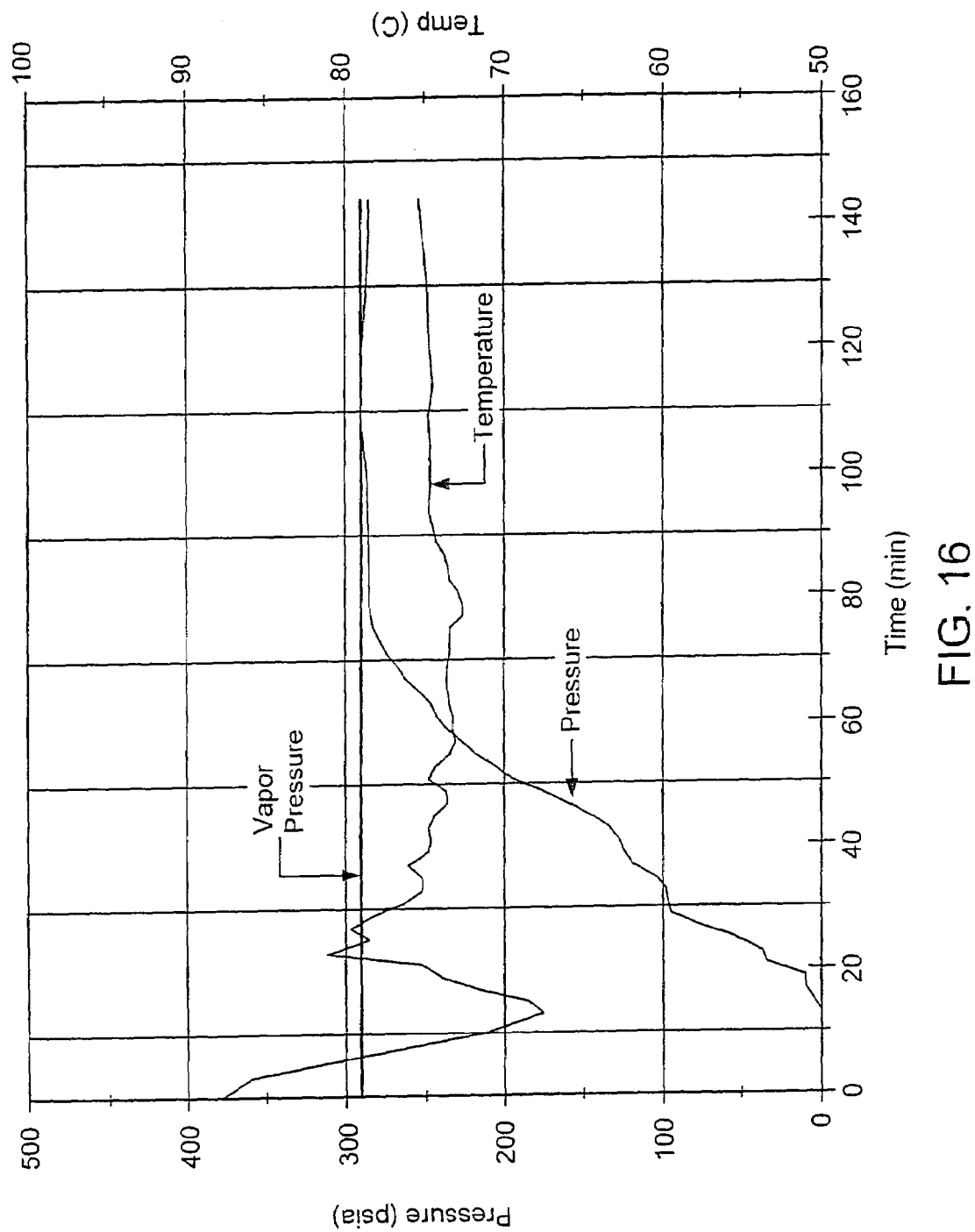
FIG. 16 is a plot of the pressure and temperature of a chamber as POM is pyrolyzed and the resulting formaldehyde vapor that is produced by the pyrolysis fills the storage chamber.

In order to evaluate the feasibility of storing formaldehyde vapors produced from POM pyrolysis, 13 grams of solid POM was placed in a heating chamber. The temperature of the POM was raised to approximately 350° C. so that predominantly formaldehyde was produced. The resulting formaldehyde vapor was admitted into a storage chamber which was maintained at a different temperature. The temperature and pressure of the gas in the storage chamber was continuously monitored. FIG. 16 shows the pressure of the vapor mass as a function of time. As the POM material was pyrolyzed, the vapor pressure increased until an equilibrium point was reached.

FIG. 16 also shows the pressure and temperature of the storage chamber, which was maintained initially at 70° C. and increased gradually as POM was pyrolyzed and formaldehyde vapor filled the storage chamber. About 12 grams of the solid POM was pyrolyzed, leaving 1 gram in the heating chamber. The mass of the formaldehyde in the vapor phase stabilized at about 9 grams. As the vapor's temperature equilibrated to approximately 75° C., the pressure stopped rising and remained constant as POM continued to pyrolyze. The value of this equilibrium pressure (~290 psi) corresponds to the vapor pressure of formaldehyde at 75° C. (indicated by the horizontal bar). It was concluded that the storage chamber contained an equilibrium mixture of gaseous formaldehyde (~9 g) and liquid formaldehyde (~2 g) at 75° C. at about 20 atm. This shows that solid POM can be converted to gas which can be stored at moderate temperature and pressure, and that this gas can be utilized for propulsion.

Example 5

Flow Burn Combustion of POM-A and POM-B with $N_2O_4$

Flow burn experiments were conducted to demonstrate sustained combustion of POM materials with oxidizers.

Oxidizer ($N_2O_4$) from a tank flowed through a PYREX® glass tube, filled with solid POM-A (available commercially as a rod). The tube was three-fourths of an inch in outer diameter and four inches in length. To initiate combustion, a thin-wire electrical heater/igniter was introduced within the tube.

First, $N_2O_4$ was directed from the tank to the tube. The heater was then turned on and the POM began to pyrolyze. The resulting pyrolyzation products, mixed with $N_2O_4$, ignited around the hot wire, as was evidenced by a clearly observable glow within the tube. The oxidizer flow was then adjusted so that there was no brown gas emanating from the open end of the tube, indicating that all of the oxidant entering the tube was consumed (i.e., there was no excess oxidant). Once this condition was reached, the heater was turned off and the glow within the tube persisted, indicating self-sustained combustion.

A similar experiment was performed using air as the oxidant rather than $N_2O_4$. The POM-A material was also shown to achieve a self-sustaining combustion. This demonstrates that a dual-functional POM material would be capable of drawing a supply of oxidant from the atmosphere and that an air-breathing vehicular propulsion system is feasible.

Similar experiments were performed on POM-B. However, since POM-B was only available in powder form, the experiments were conducted in a horizontal PYREX® glass tube enclosing a cylinder, made from stainless steel mesh, along its axis. The mesh was sufficiently fine to prevent the powder from entering the central cylinder through which $N_2O_4$ was introduced. The heater/igniter assembly was inserted into the mesh tube from the bottom end, such that the igniter was placed near the top end of the tube. A thermocouple was also inserted into the mesh cylinder from the top end and then the glass tube was closed with a metallic fitting.

As before, an oxidant ($N_2O_4$) flowed through the glass tube filled with powdered POM-B and the same ignition-burn procedures were followed. Upon ignition, the burn zone first spread radially from the steel cylinder to the glass surface, and then proceeded axially along the length of the tube. POM-B burned very smoothly and evenly, leaving the glass surface very clean, with little or no remaining residue from the combustion process.

Figure 17:
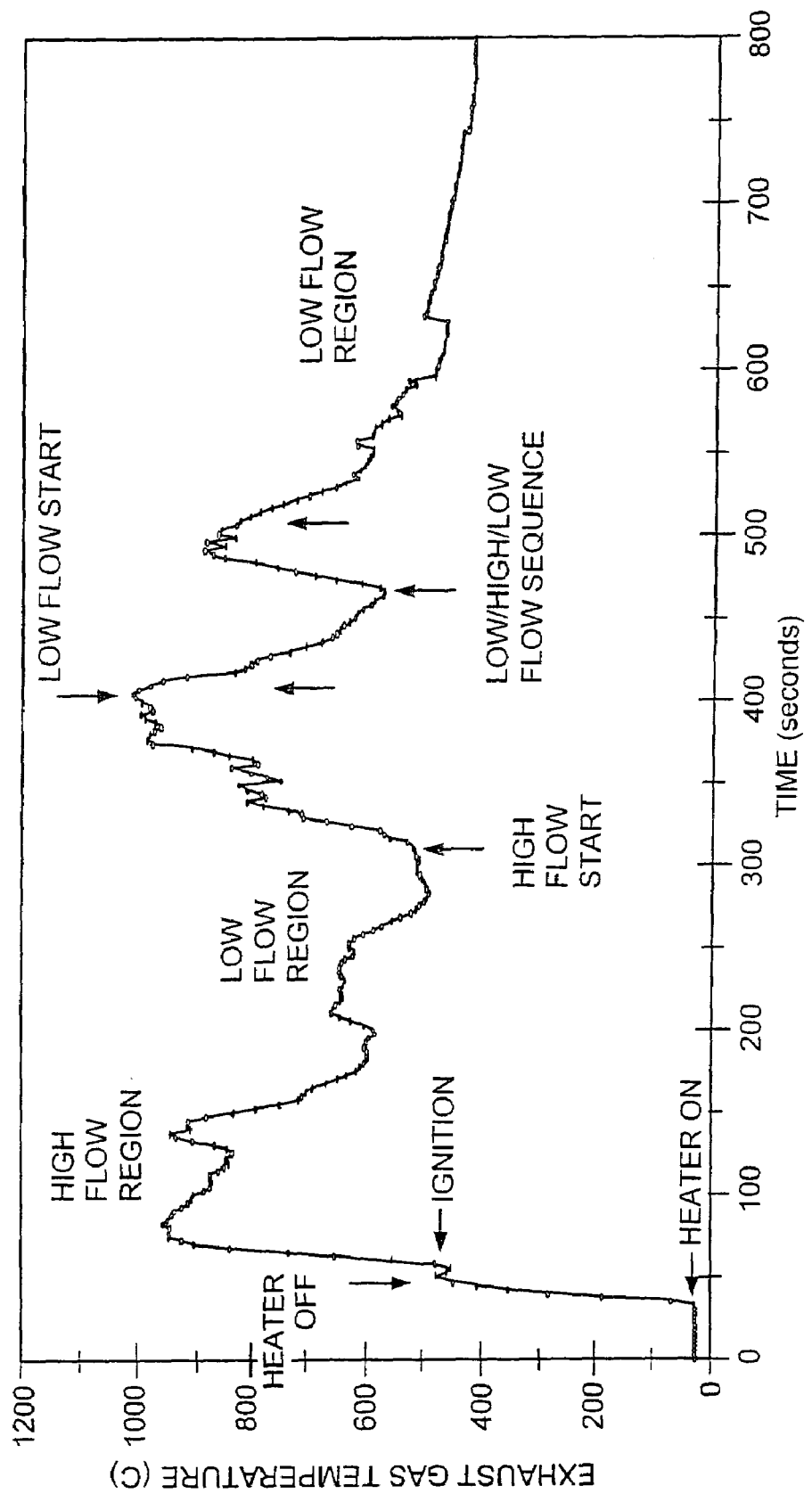
FIG. 17 is a plot of thermocouple measurements obtained during combustion of polyoxymethylene in oxygen as oxidant flow rate is varied, demonstrating controllability of the combustion reaction.

FIG. 17 shows the thermocouple measurements obtained during the POM-B flow-burn experiment. The measurements give the temperature of the products of combustion versus time. As shown, the heater was turned on at about the 40 second mark. The heater was turned off after about five seconds when ignition of the POM-B material occurred. The large temperature jump at about the 50 second mark indicated that the combustion was self-sustaining. As the $N_2O_4$ flow rate was varied the temperature of combustion increased or decreased, demonstrating the controllability of the combustion process.

Example 6

Flow Calorimetry Combustion of POM-B With $N_2O$

Flow calorimetry experiments were performed to show the combustion of POM-B with $N_2O$, measure the energy released during the combustion, and validate thermochemistry predictions. Thermochemistry predictions indicated two possible reactions for the POM-$N_2O$ bipropellant system, and are listed in Table 1.

TABLE 1

| Reaction # | Products | Energy Release (kJ/g mixture) |
|---|---|---|
| 1 | $CO, H_2O, N_2$ | 7.0 |
| 2 | $CO_2, H_2O, N_2$ | 21.0 |

The apparatus consisted of a PYREX® glass tube of propellant POM-B through which the oxidizer ($N_2O$) was introduced from an oxidizer mass flow controller. A stainless steel tube was connected at the bottom of the PYREX® glass tube and wound through a water-filled thermos in order to act as a heat exchanger. A thermocouple was used to monitored the temperature of the water. A second thermocouple monitored the temperature of the exhaust gases to ensure that it was close to the temperature of the water, thus indicating that almost all of the heat of reaction had been transferred to the water. Mass loss of the tube material and the total amount of oxidizer utilized was also measured. A heater was installed inside of the PYREX® glass tube to initiate the reaction.

The heat released in the calorimetry experiments of POM-B with $N_2O$ is consistent with the predominance of reaction 2, i.e., POM is fully oxidized to $CO_2$ and $H_2O$ while $N_2O$ is reduced completely to $N_2$. This demonstrates complete combustion for the POM-$N_2$O system, accompanied by high heat release, which is important for the design of high performance thrusters.

Example 7

Combustion of POM with HMX and $N_2O_4$

Energetic material HMX, which combines both a fuel and/or an oxidant within its molecular structure, can be added to enhance the performance of POM combustion. Before mixing HMX with POM-A, it was necessary to ensure their chemical compatibility and estimate their long-term stability. This was accomplished using a Simulated Bulk Autoignition Tests (SBAT).

A few grams of a mixture of POM propellant and HMX were put within a crucible which was then placed inside an aluminum block. The crucible was kept thermally insulated from the block. The aluminum block was heated slowly while thermocouples monitored the temperature of both the mixture and the block. As the mixture melted, its temperature was lower relative to the block temperature. As the material was gradually heated, the POM-A and HMX began to react with each other. As they reacted, they released heat and the mixture temperature rose relative to the block temperature. The data obtained from a SBAT is plotted as the difference between the mixture temperature and block temperature versus the block temperature.

Figure 18:
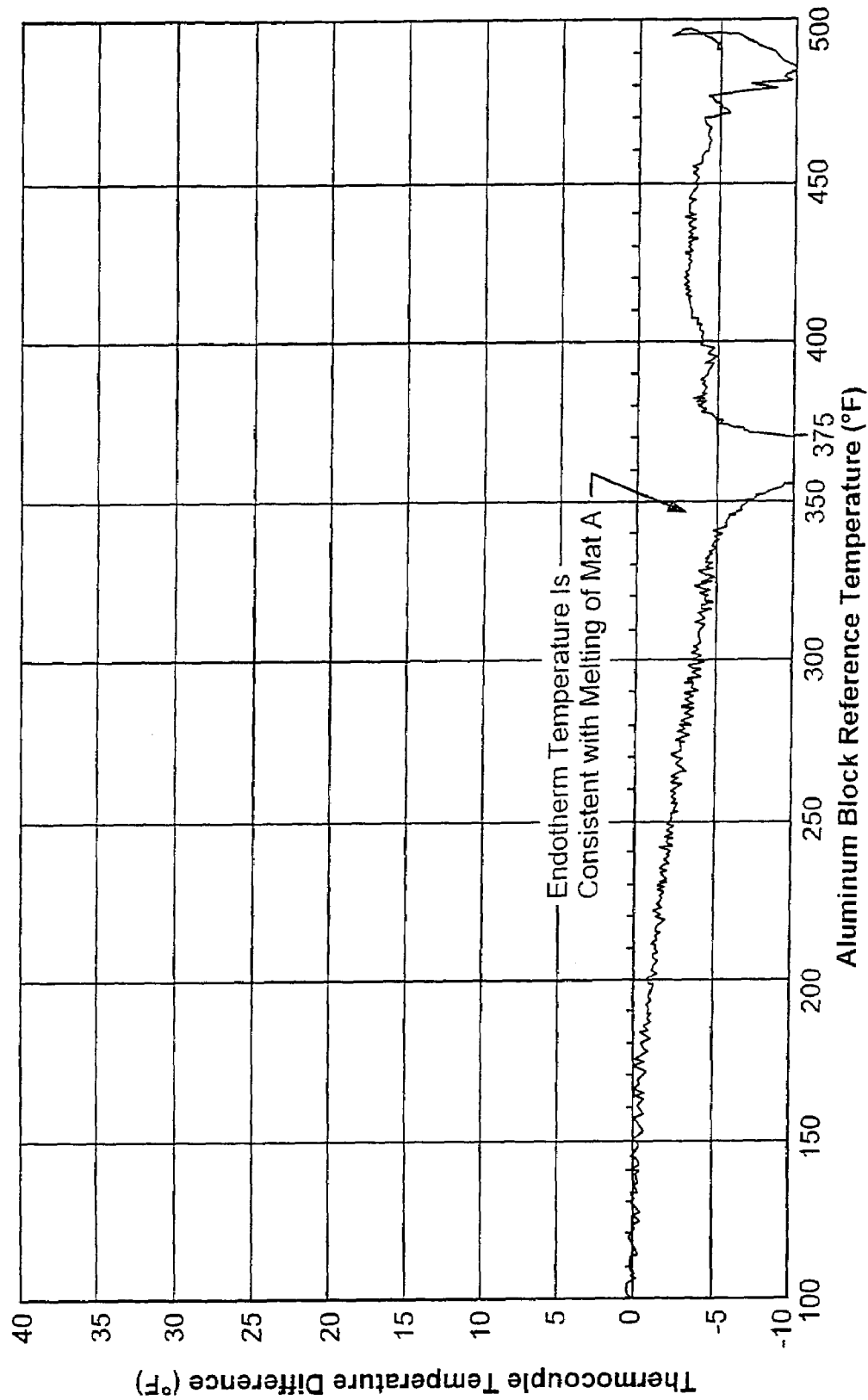
FIG. 18 is a plot of thermocouple measurements from a Simulated Bulk Autoignition Test (SBAT) of POM-A.

FIG. 18 shows the SBAT results for POM-A alone. An endotherm (i.e., a beginning of rapid negative temperature difference) began at about 340° F. (~171° C.), which is consistent with the melting temperature of POM-A.

Figure 19:
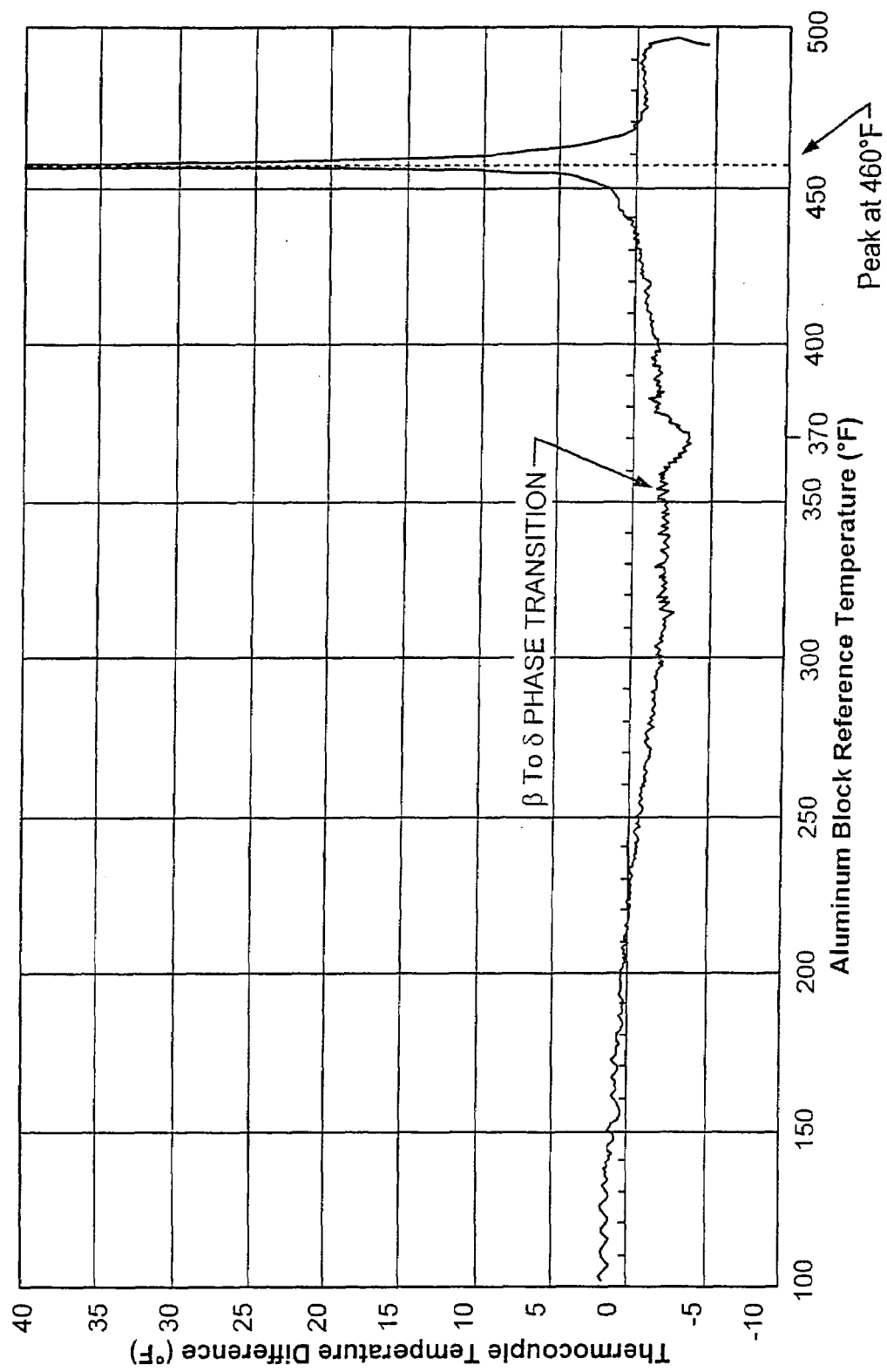
FIG. 19 is a plot of thermocouple measurements from a SBAT of cyclotetramethylenetetranitramine (HMX).

FIG. 19 shows the SBAT results for HMX alone. At approximately 355° F. (~179° C.), a slight endotherm was observed. This is consistent with HMX's phase transition from what is known as the P crystalline structure to the δ crystalline structure. A peak in an exotherm (beginning of rapid positive temperature difference due to energy release by the testing material) was observed at about 460° F. (~238° C.).

Figure 20:
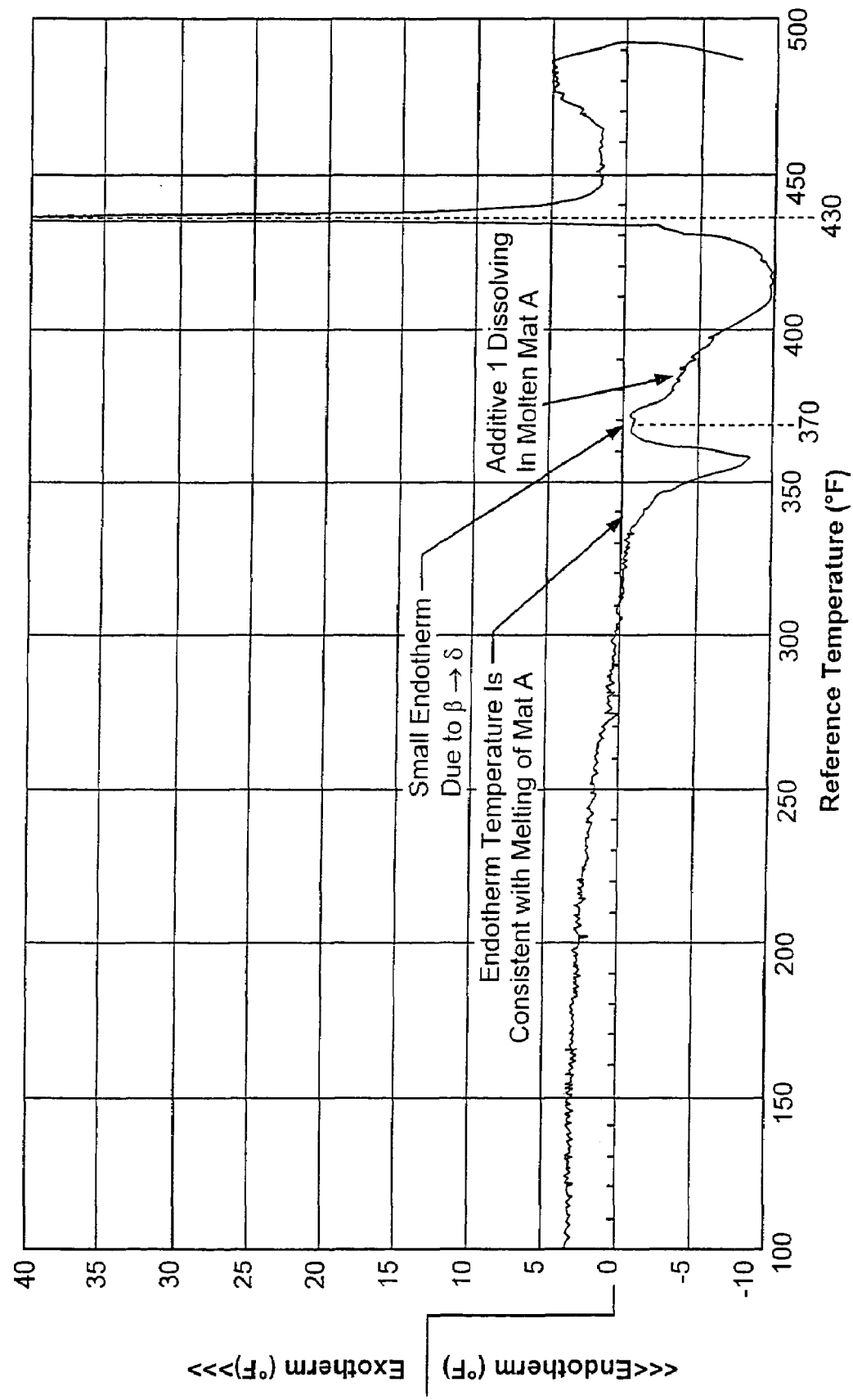
FIG. 20 is a plot of thermocouple measurements from a SBAT of a mixture of POM-A and HMX.

FIG. 20 shows the SBAT results for a mixture composed of an equal amount of POM-A and HMX. An endotherm began around 340° F. (~170° C.), which marked the melting of POM-A as observed in the SBAT of POM-A alone. A second endotherm was observed at about 370° F. (~188° C.), marking the HMX phase shift. The peak exotherm occurred around 430° F. (~220° C.), about 30° F. lower (~17° C. lower) than the exotherm observed in the SBAT of HMX alone. This indicates that HMX is somewhat less stable when mixed with POM-A. However, the peak exotherm of the mixture was still about 90° F. higher (~50° C. higher) than the melting temperature of POM-A. These differences indicate that there is a sufficient safe range of temperatures where POM-A and HMX may be mixed and processes during a fuel production process.

Figure 21:
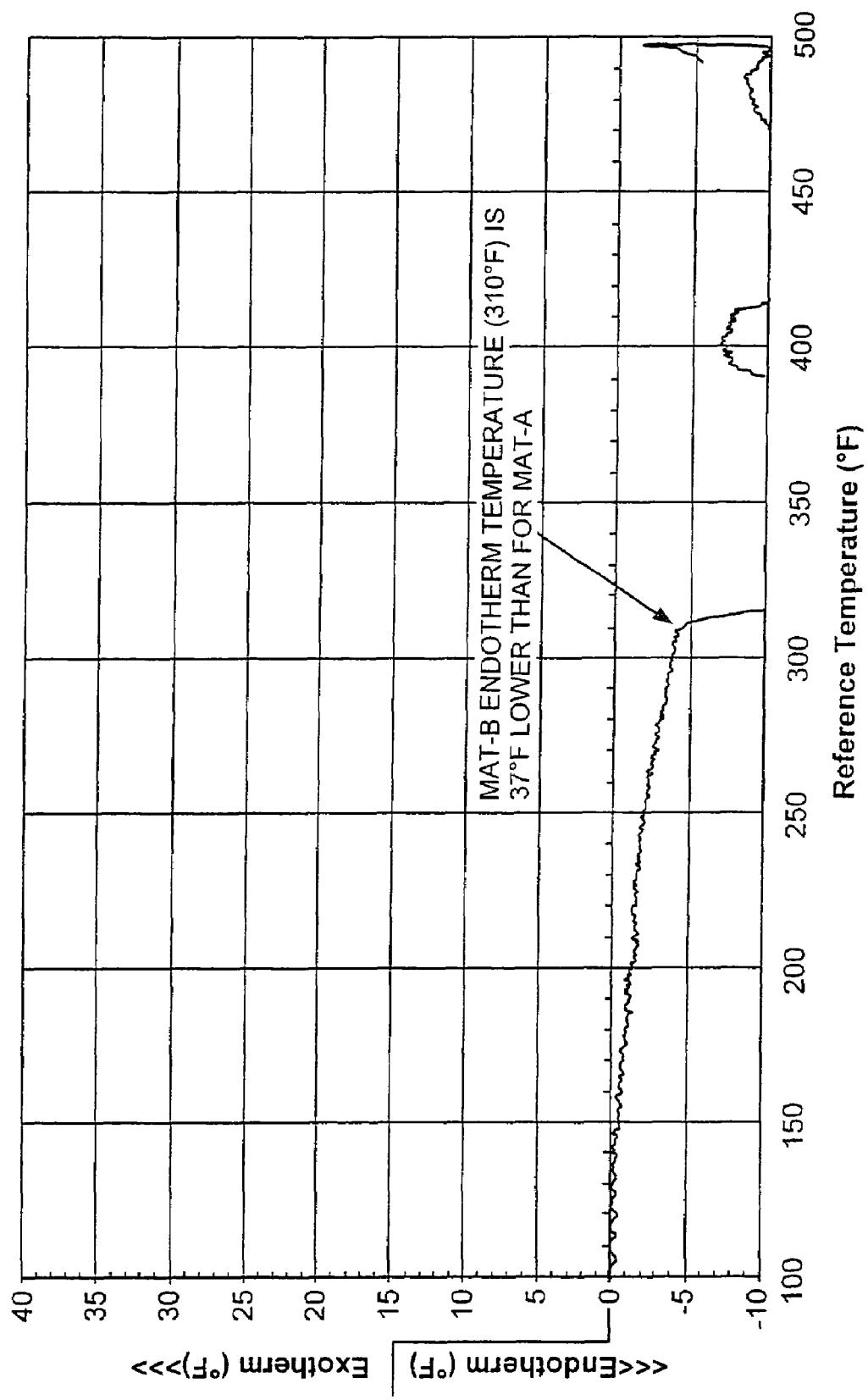
FIG. 21 is a plot of thermocouple measurements from a SBAT of POM-B.

FIG. 21 shows the SBAT results for POM-B alone. An endotherm began about 37° F. (~20° C.) lower than that recorded for POM-A alone.

Figure 22:
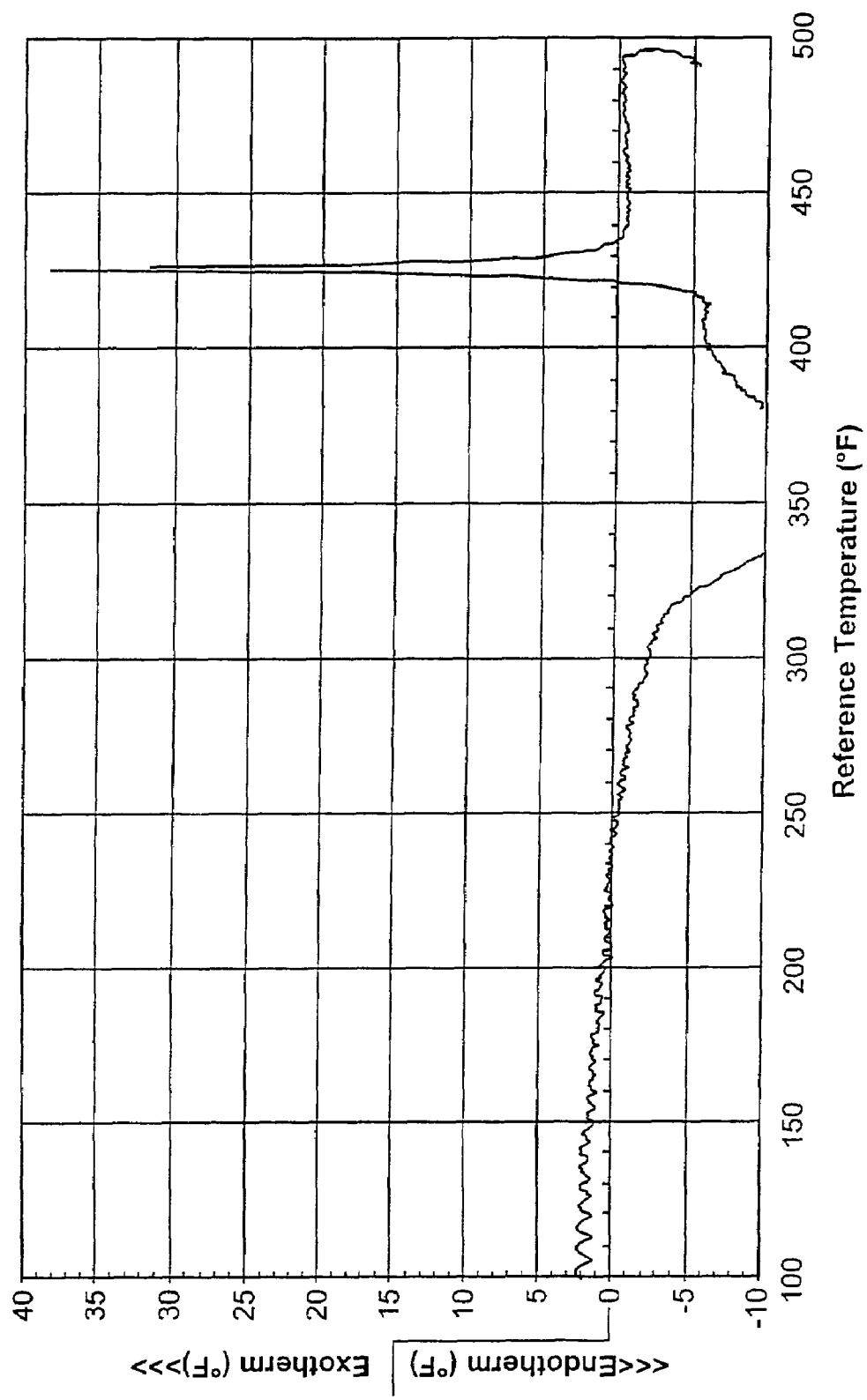
FIG. 22 is a plot of thermocouple measurements from a SBAT of a mixture of POM-B and HMX.

FIG. 22 shows the SBAT results for a mixture composed of an equal amount of both POM-B and HMX. An endotherm began around 320° F. (~160° C.), which marked the melting of POM-B as observed in the SBAT of POM-B alone. As with POM-A, the peak exotherm occurred around 430° F. (~221° C.).

Example 8

Bomb Calorimetry Combustion of POM with HMX and $N_2O_4$

Following the demonstration of chemical compatibility between POM-A and HMX, standard bomb calorimetry experiments were conducted to measure the heat released during a reaction between a POM-A/HMX mixture (75/25 wt %) and $N_2O_4$. Table 2 lists some of the possible products of a POM-A/HMX reaction.

TABLE 2

| Reaction # | Oxidizer | Products | Energy Released (kJ/g mixture) |
|---|---|---|---|
| 1 | $N_2O_4$ | CO, $H_2O$, NO | 4.63 |
| 2 | $N_2O_4$ | CO, $H_2O$, $N_2$ | 5.93 |
| 3 | $N_2O_4$ | $CO_2$, $H_2O$, NO | 9.75 |
| 4 | $N_2O_4$ | $CO_2$, $H_2O$, $N_2$ | 13.9 |

Based on the stoichiometry of reactions 1 and 4, a 1 gram portion of the POM-A/HMX mixture (with a 75-25 molar ratio of POM-A to HMX) was placed into a ceramic crucible. Chilled liquid $N_2O_4$ was added to the sample. The bomb calorimetry chamber was pressurized with argon to 5 atm and the materials were electrically ignited. Heat was transferred to the water bath and the resulting temperature rise was measured. It was determined that the combustion released 12.7 kJ/g of heat. The experiment was repeated, and all measured values were within 3% of 12.7 kJ/g. This indicates that when mixed with the energetic additive HMX and combusted with the oxidizer $N_2O_4$, reaction 4 dominates and POM-A can be fully oxidized to $CO_2$ and $H_2O$ with $N_2O_4$ being completely reduced to $N_2$. This also indicates that POM-based fuels can combust completely and give off a large amount of heat in the process, both of these characteristics are important to the design of high performance thrusters.

Example 9

Figure 23:
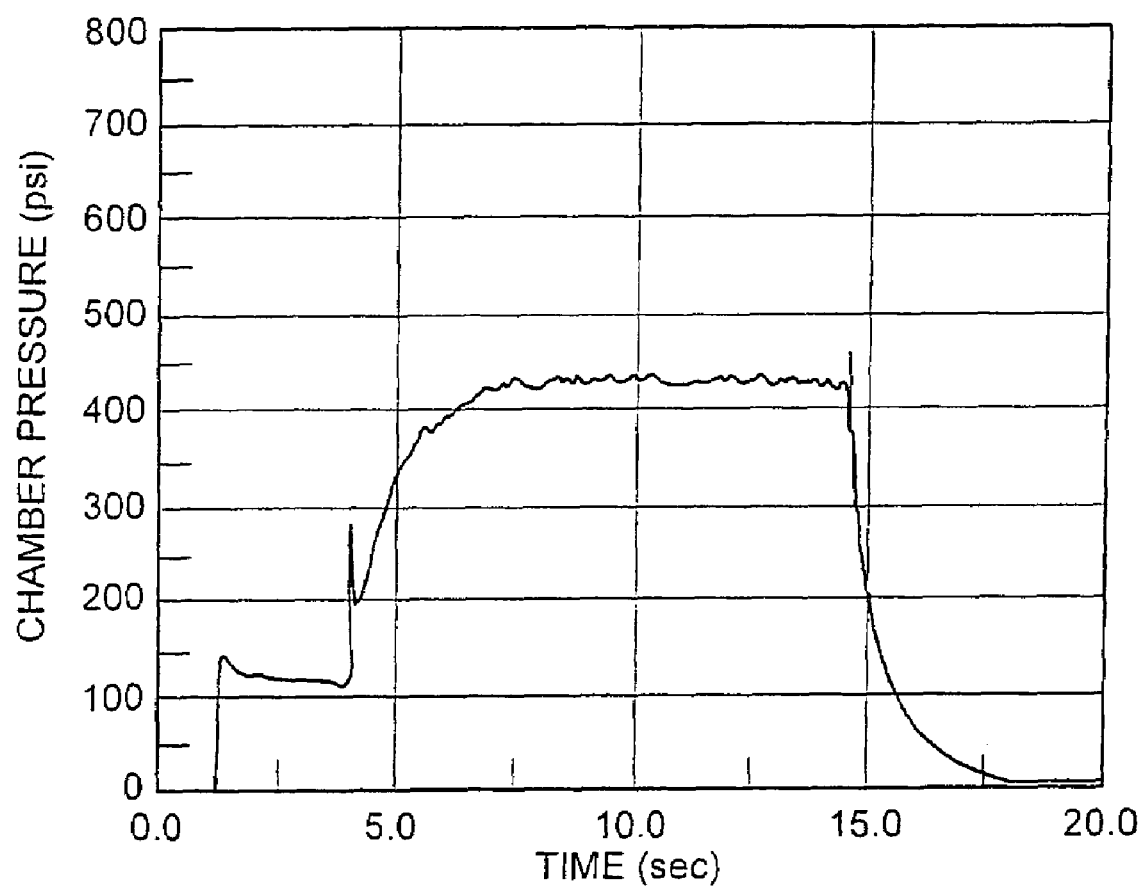
FIG. 23 is a plot of pressure as a function of time from the sustained combustion of a POM composite with oxygen in one embodiment of a stinger/thruster configuration of the invention.

Sustained Stable Combustion of POM and Carbon-reinforced POM Composites With Oxygen A POM composite was constructed with DELRIN® reinforced with a carbon cloth. The POM composite was combusted with oxygen inside a thruster/stringer configuration similar to that exemplified in FIG. 6. FIG. 23 shows pressure data as a function of time from the sustained stable combustion (after ignition by a squib) of the POM composite in the thruster/stinger configuration.

Example 10

Sustained Stable Combustion of POM Composite with Hydrogen Peroxide

A POM composite was combusted with liquid hydrogen peroxide in a stringer/thruster configuration similar to that exemplified in FIG. 6. FIGS. 24-27 show pressure data from a sustained stable combustion as a function of time (measured in seconds). A catalyst bed was encased within the shell of the stringer/thruster. The catalyst bed was preheated and hydrogen peroxide directed through it. The hydrogen peroxide decomposed into hot oxygen and steam, which entered channel 72 within the self-consuming stringer/thruster and reacted with the fuel.

Figure 24:
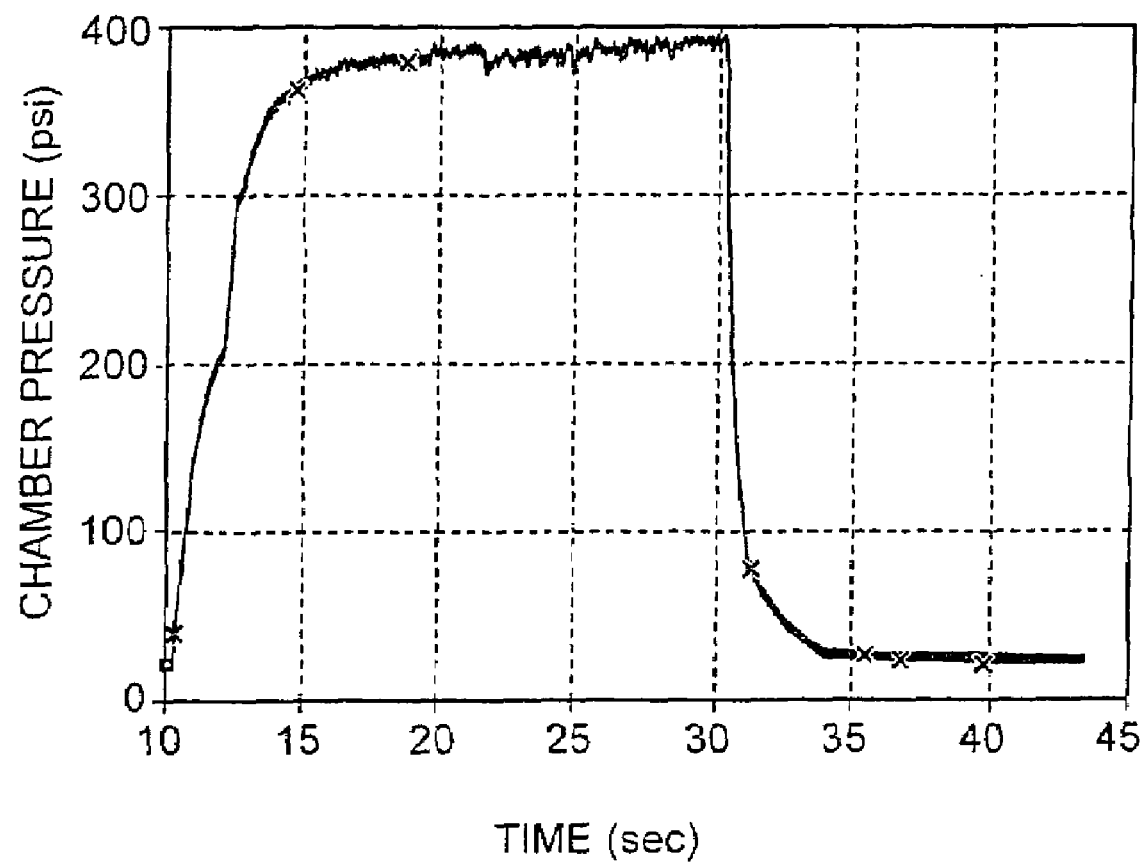
FIG. 24 is a plot of pressure data from the sustained combustion of POM with hydrogen peroxide in one embodiment of a stinger/thruster configuration of the invention.
Figure 25:
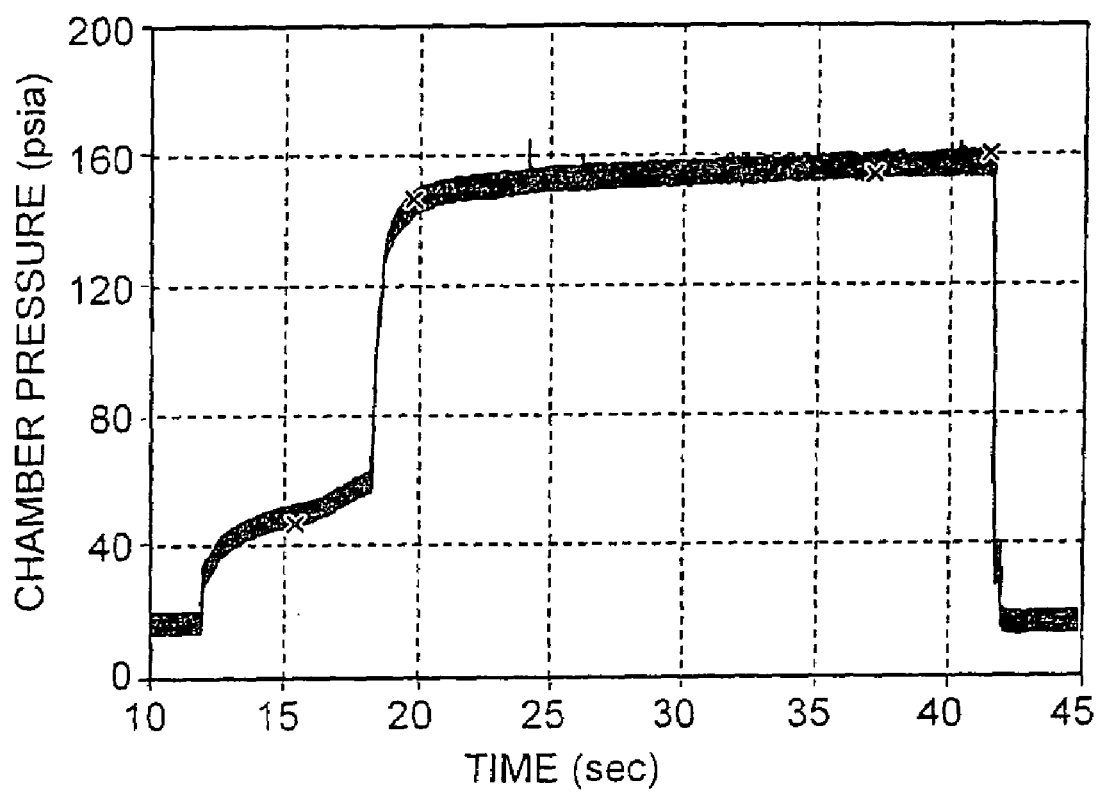
FIG. 25 is a plot of pressure data from the sustained combustion of POM with hydrogen peroxide in one embodiment of a stinger/thruster configuration of the invention.
Figure 26:
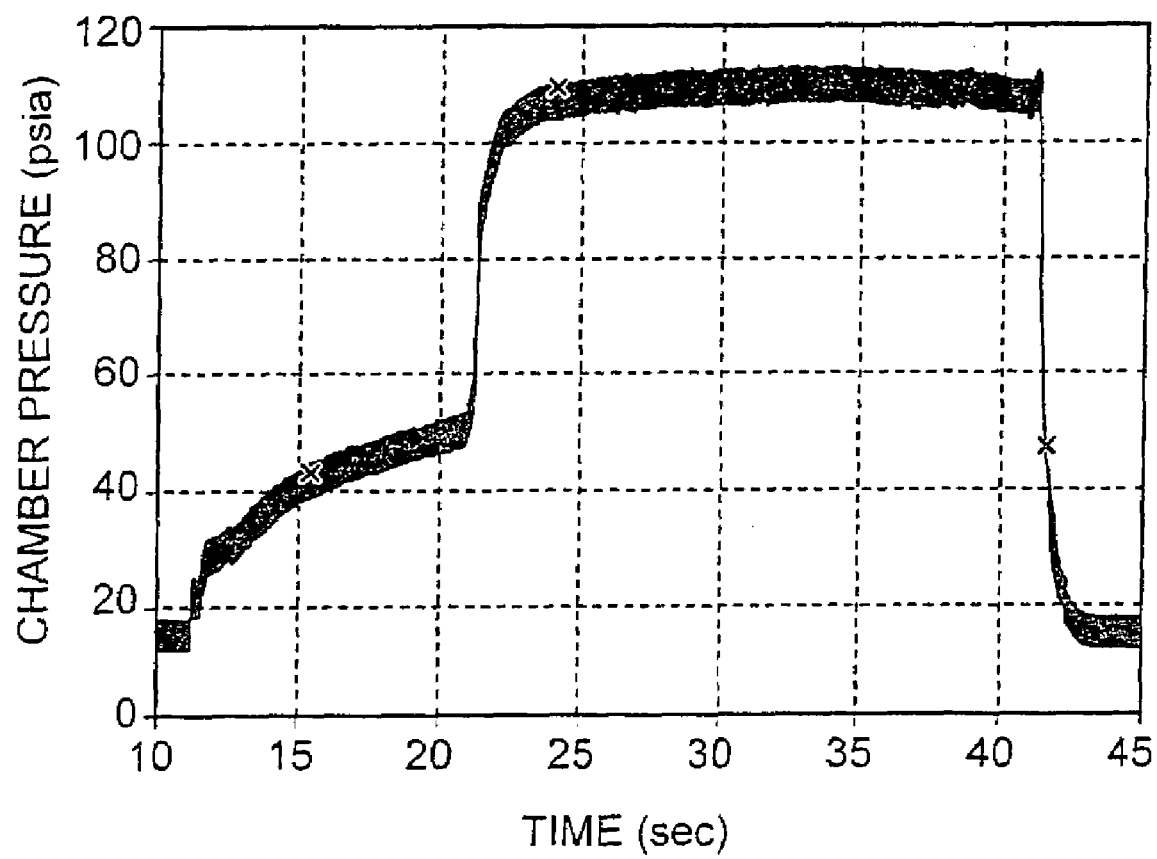
FIG. 26 is a plot of pressure data from the sustained combustion of POM with hydrogen peroxide in one embodiment of a stinger/thruster configuration of the invention.

The internal pressure of the stringer/thruster began at atmospheric and increased quickly as the pyrolysis and combustion products were formed. The pressure data from one test run is shown in FIG. 24. The internal pressure of the stringer/thruster climbed to more than 300 psia in about 12 seconds. FIG. 25 shows another test run, where the internal pressure reached about 110 psia. FIG. 26 shows yet another test run where the internal pressure was maintained at slightly less than 160 psia. The thruster/stringer exhibited smooth, sustained combustion in all cases.

Figure 27:
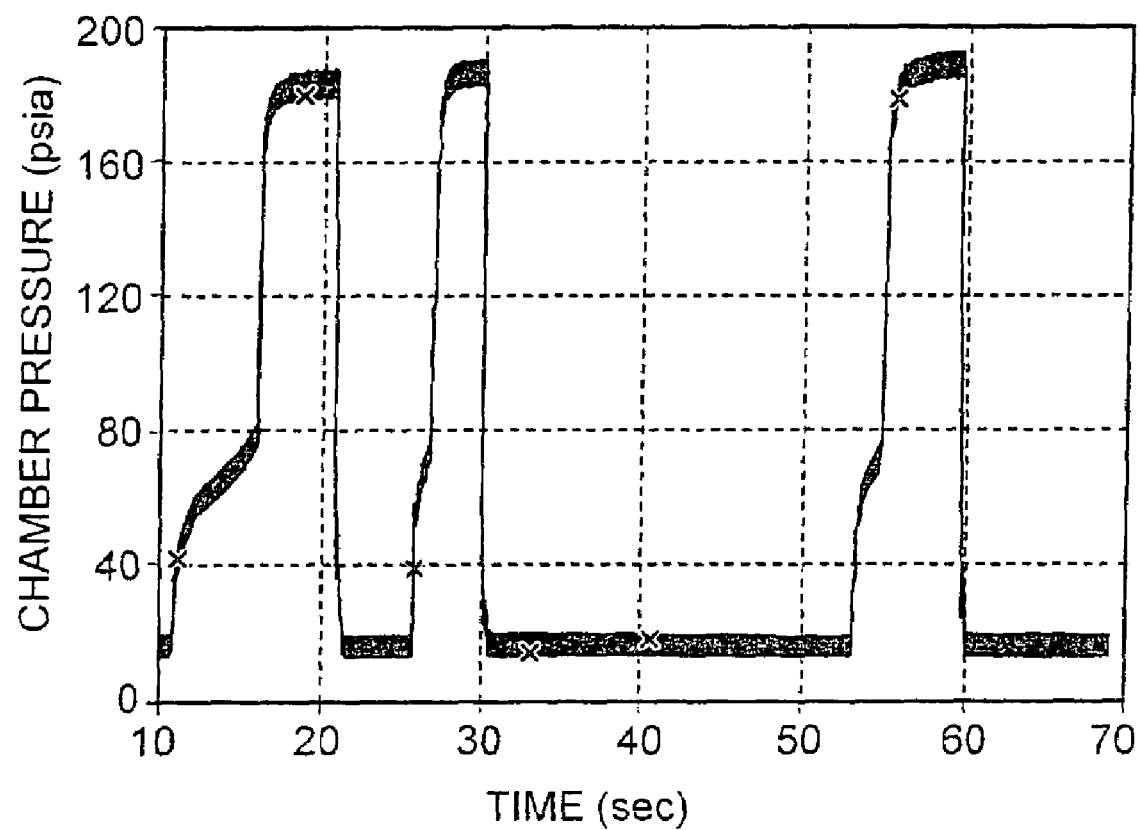
FIG. 27 is a plot of pressure data from a 3-pulse thrust profile obtained during the combustion of POM with hydrogen peroxide in one embodiment of a stinger/thruster configuration of the invention.

FIG. 27 shows still another test run where hydrogen peroxide was supplied to the stringer/thruster in 3 seperate pulses. The internal pressure profile shows three spikes in internal pressure. All three followed the change in oxidant flow relatively quickly, with a lag time of only a few seconds or less.

Figure 28:
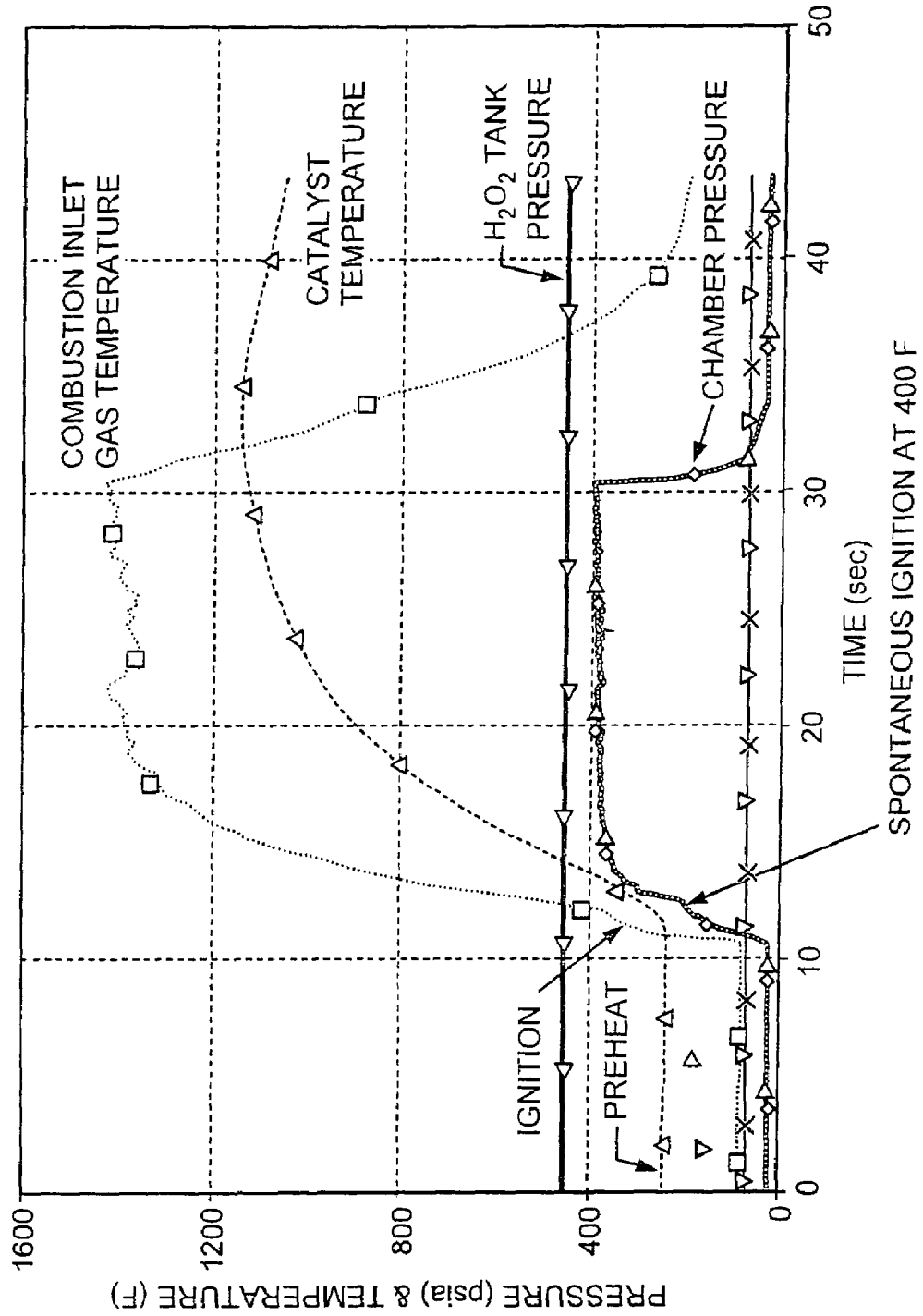
FIG. 28 is a plot of the combustion pressure and temperature during combustion of a POM composite with hydrogen peroxide in one embodiment of a stinger/thruster configuration of the invention.

FIG. 28 shows the pressure and temperature data obtained from yet another run, including the pressure and temperature of the hydrogen peroxide, the temperature of the catalyst, the combustion inlet gas temperature, and the chamber pressure. Pressure (psia) and temperature (F) are both shown on the Y-axis as a function of time (sec). The pressure of the oxidant supply tank was kept constant. Hydrogen peroxide was used as the oxidant. During the preheat of the first 10 seconds, the catalyst temperature remained relatively low. Ignition occurred at about 11 seconds. With ignition, the catalyst temperature, as well as chamber pressure and combustion inlet gas temperature, rises rapidly.

EQUIVALENTS

While this invention has been particularly shown and described with references to preferred embodiments thereof, it will be understood by those skilled in the art that various changes in form and details may be made therein without departing from the scope of the invention encompassed by the appended claims. For example, all dimensions and weights identified with respect to FIGS. 3 through 14 are nominal dimensions and weights; the invention is not constrained by these dimensions and weights.

What is claimed is:

1. A method of propelling a vehicle, comprising the steps of:
   a) employing at least a portion of a solid material including polyoxymethylene and an energetic additive, wherein the energetic additive includes at least one member selected from the group consisting of 2,4,6-trinitrotoluene, cyclotrimethylenetrinitramine, 1-acetyl-3,5-dinitrocyclotrimethylenetriamine, cyclotetramethylenetetranitramine, 1-acetyl-3,5,7-trinitrocyclotetramethylenetetramine, nitroglycerin, nitroguanidine, nitrocellulose and an amide, to provide structural support to at least a portion of the vehicle;
   b) producing a propulsive gas; and
   c) propelling the vehicle with thrust by asymmetrically directing at least a portion of the propulsive gas away from the vehicle.

2. A method of propelling a vehicle, comprising the steps of:
   a) employing at least a portion of a solid material including polyoxymethylene and at least one of a solid oxidant or an energetic additive to provide structural support to at least a portion of the vehicle;
   b) contacting hydrogen peroxide with a catalyst to produce a catalysis reaction product and combusting the solid material with the catalysis reaction product to produce a propulsive gas; and
   c) propelling the vehicle with thrust by asymmetrically directing at least a portion of the propulsive gas away from the vehicle.

3. A method of propelling a vehicle, comprising the steps of:
   a) employing at least a portion of a solid material including polyoxymethylene and potassium perchlorate to provide structural support to at least a portion of the vehicle;
   b) combusting the solid material to produce a propulsive gas from the solid material; and
   c) propelling the vehicle with thrust by asymmetrically directing at least a portion of the propulsive gas away from the vehicle.

4. A vehicle comprising at least one solid material, wherein the solid material is a structural support member of at least one portion of the vehicle and wherein the solid material is a propellant comprising polyoxymethylene and an energetic additive, wherein the energetic additive includes at least one member selected from the group consisting of 2,4,6-trinitrotoluene, cyclotrimethylenetrinitramine, 1-acetyl-3,5-dinitrocyclotrimethylenetriamine, cyclotetramethylenetetranitramine, 1-acetyl-3,5,7-trinitrocyclotetramethylenetetramine, nitroglycerin, nitroguanidine, nitrocellulose and an amide, to provide structural support to at least a portion of the vehicle.

5. The vehicle of claim 4, wherein the solid material is a structural support member selected from the group consisting of a structural panel, a support beam and a support rod.

* * * * *

UNITED STATES PATENT AND TRADEMARK OFFICE
CERTIFICATE OF CORRECTION

PATENT NO. : 7,647,763 B2
APPLICATION NO. : 11/086789
DATED : January 19, 2010
INVENTOR(S) : Joshi et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Sixteenth Day of November, 2010

David J. Kappos
*Director of the United States Patent and Trademark Office*